US010254166B2

(12) United States Patent
Kester et al.

(10) Patent No.: US 10,254,166 B2
(45) Date of Patent: Apr. 9, 2019

(54) DIVIDED-APERTURE INFRA-RED SPECTRAL IMAGING SYSTEM FOR CHEMICAL DETECTION

(71) Applicant: Rebellion Photonics, Inc., Houston, TX (US)

(72) Inventors: Robert T. Kester, Pearland, TX (US); Nathan A. Hagen, Utsunomiya (JP)

(73) Assignee: Rebellion Photonics, Inc., Houston, TX (US)

( * ) Notice: Subject to any disclaimer, the term of this patent is extended or adjusted under 35 U.S.C. 154(b) by 0 days.

(21) Appl. No.: 15/471,398

(22) Filed: Mar. 28, 2017

(65) Prior Publication Data

US 2017/0356802 A1   Dec. 14, 2017

Related U.S. Application Data

(63) Continuation of application No. 14/543,692, filed on Nov. 17, 2014, now Pat. No. 9,625,318, which is a continuation of application No. PCT/US2013/041278, filed on May 16, 2013.

(60) Provisional application No. 61/764,776, filed on Feb. 14, 2013, provisional application No. 61/688,630, filed on May 18, 2012.

(51) Int. Cl.
*G01J 3/28*   (2006.01)
*G01J 5/00*   (2006.01)
*G01J 3/36*   (2006.01)
*G01J 3/02*   (2006.01)

(52) U.S. Cl.
CPC ............... *G01J 3/36* (2013.01); *G01J 3/0232* (2013.01); *G01J 3/2823* (2013.01); *G01J 2003/2826* (2013.01)

(58) Field of Classification Search
CPC .......... G01J 3/36; G01J 3/0232; G01J 3/2823
See application file for complete search history.

(56) References Cited

U.S. PATENT DOCUMENTS 3,841,763 A * 10/1974 Lewis ............... G01N 33/0027
                                                            356/219
3,849,005 A    11/1974 Girard et al.
4,134,683 A     1/1979 Goetz et al.
(Continued)

FOREIGN PATENT DOCUMENTS

CA    2 365 866    9/2000
CA    2 787 303    7/2011
(Continued)

OTHER PUBLICATIONS

Adams, et al., "Advances in Detectors: Hot IR sensors improve IR camera size, weight, and power", Laser Focus World, vol. 50, Issue 01, Jan. 17, 2014, 6 pages. Also available at http://www.ircameras.com/articles/advances-detectors-hot-ir-sensors-improve-ir-camera-size-weight-power/.

(Continued)

*Primary Examiner* — Michael C Bryant
(74) *Attorney, Agent, or Firm* — Knobbe Martens Olson & Bear LLP

(57) ABSTRACT

A divided-aperture infrared spectral imaging (DAISI) system that is structured to provide identification of target chemical content in a single imaging shot based on spectrally-multiplexed operation. The system is devoid of spectral scanning acquisition of infrared (IR) spectral signatures of target content with an IR detector and does not require content.

16 Claims, 11 Drawing Sheets

(56) References Cited

U.S. PATENT DOCUMENTS

| | | | |
|---|---|---|---|
| 4,464,789 A | 8/1984 | Sternberg | |
| 4,933,555 A | 6/1990 | Smith | |
| 4,963,963 A | 10/1990 | Dorman | |
| 5,127,742 A | 7/1992 | Fraden | |
| 5,157,258 A | 10/1992 | Gunning, III et al. | |
| 5,354,987 A | 10/1994 | MacPherson | |
| 5,550,373 A * | 8/1996 | Cole | G01J 3/02 250/338.1 |
| 5,559,336 A | 9/1996 | Kosai et al. | |
| 5,604,346 A | 2/1997 | Hamrelius et al. | |
| 5,822,222 A | 10/1998 | Kaplinsky et al. | |
| 5,877,500 A | 3/1999 | Braig et al. | |
| 5,920,066 A | 7/1999 | DiRenzo et al. | |
| 5,926,283 A | 7/1999 | Hopkins | |
| 5,973,844 A | 10/1999 | Burger | |
| 5,994,701 A | 11/1999 | Tsuchimoto et al. | |
| 6,023,061 A | 2/2000 | Bodkin | |
| 6,184,529 B1 | 2/2001 | Contini | |
| 6,268,883 B1 | 7/2001 | Zehnder et al. | |
| 6,456,261 B1 | 9/2002 | Zhang | |
| 6,465,785 B1 | 10/2002 | McManus | |
| 6,556,853 B1 | 4/2003 | Cabib et al. | |
| 6,680,778 B2 | 1/2004 | Hinnrichs et al. | |
| 6,700,527 B1 * | 3/2004 | Martin | G01S 7/41 342/173 |
| 7,109,488 B2 | 9/2006 | Milton | |
| 7,119,337 B1 * | 10/2006 | Johnson | G01J 3/02 250/339.13 |
| 7,242,478 B1 | 7/2007 | Dombrowski et al. | |
| 7,315,377 B2 | 1/2008 | Holland et al. | |
| 7,321,119 B2 | 1/2008 | King | |
| 7,364,697 B2 | 4/2008 | McFarland et al. | |
| 7,433,042 B1 | 10/2008 | Cavanaugh et al. | |
| 7,606,484 B1 | 10/2009 | Richards et al. | |
| 7,634,157 B1 | 12/2009 | Richards et al. | |
| 7,750,802 B1 | 7/2010 | Parish et al. | |
| 7,835,002 B2 | 11/2010 | Muhammed et al. | |
| 7,888,624 B1 | 2/2011 | Murguia et al. | |
| 8,027,041 B1 | 9/2011 | Mitchell et al. | |
| 8,153,980 B1 | 4/2012 | Brady et al. | |
| 8,159,568 B2 | 4/2012 | Ahdoot | |
| 8,212,213 B2 | 7/2012 | Myrick et al. | |
| 8,373,757 B1 | 2/2013 | Nguyen | |
| 8,629,930 B2 | 1/2014 | Brueckner et al. | |
| 8,653,461 B1 | 2/2014 | Benson et al. | |
| 8,654,328 B2 | 2/2014 | Tkaczyk et al. | |
| 9,395,516 B2 | 7/2016 | Katsunuma et al. | |
| 9,562,849 B2 | 2/2017 | Kester et al. | |
| 9,599,508 B2 | 3/2017 | Kester et al. | |
| 9,625,318 B2 | 4/2017 | Kester et al. | |
| 9,641,772 B2 | 5/2017 | Yujiri | |
| 9,644,562 B2 | 5/2017 | Fujita | |
| 9,756,263 B2 | 9/2017 | Kester et al. | |
| 2001/0040216 A1 * | 11/2001 | Knauth | G01J 5/20 250/352 |
| 2002/0015151 A1 | 2/2002 | Gorin | |
| 2002/0121370 A1 | 9/2002 | Kurkjian et al. | |
| 2002/0159101 A1 | 10/2002 | Alderson et al. | |
| 2003/0102435 A1 | 6/2003 | Myers et al. | |
| 2003/0134426 A1 | 7/2003 | Jiang et al. | |
| 2003/0183756 A1 | 10/2003 | Huniu | |
| 2004/0093167 A1 | 5/2004 | Braig et al. | |
| 2004/0111232 A1 | 6/2004 | Butler et al. | |
| 2004/0252300 A1 | 12/2004 | Slater | |
| 2005/0029453 A1 | 2/2005 | Allen et al. | |
| 2005/0103989 A1 | 5/2005 | Watson et al. | |
| 2006/0044562 A1 | 3/2006 | Hagene et al. | |
| 2006/0183241 A1 | 8/2006 | Lehmann et al. | |
| 2006/0232675 A1 | 10/2006 | Chamberlain et al. | |
| 2006/0279632 A1 | 12/2006 | Anderson | |
| 2007/0018105 A1 | 1/2007 | Grimberg | |
| 2007/0075888 A1 | 4/2007 | Kelly et al. | |
| 2007/0108385 A1 * | 5/2007 | Mantese | G01J 5/34 250/338.3 |
| 2007/0170359 A1 | 7/2007 | Syllaios et al. | |
| 2007/0170363 A1 | 7/2007 | Schimert et al. | |
| 2008/0170140 A1 | 7/2008 | Silver et al. | |
| 2008/0204744 A1 | 8/2008 | Mir et al. | |
| 2008/0231719 A1 | 9/2008 | Benson et al. | |
| 2008/0251724 A1 | 10/2008 | Baliga et al. | |
| 2009/0252650 A1 | 10/2009 | Lakshmanan | |
| 2010/0162206 A1 | 6/2010 | Roth et al. | |
| 2010/0171866 A1 * | 7/2010 | Brady | G02B 3/0056 348/340 |
| 2010/0211333 A1 | 8/2010 | Pruet et al. | |
| 2010/0309467 A1 | 12/2010 | Fox et al. | |
| 2011/0176577 A1 | 7/2011 | Bandara et al. | |
| 2011/0185048 A1 | 7/2011 | Yew et al. | |
| 2011/0261321 A1 | 10/2011 | Ramella-Roman et al. | |
| 2012/0273680 A1 | 11/2012 | Furry | |
| 2013/0181836 A1 | 7/2013 | Cardoso et al. | |
| 2013/0206990 A1 | 8/2013 | Hsu et al. | |
| 2013/0228887 A1 | 9/2013 | Wehner et al. | |
| 2013/0235256 A1 | 9/2013 | Kodama | |
| 2013/0250124 A1 | 9/2013 | Furry | |
| 2013/0307991 A1 | 11/2013 | Olsen et al. | |
| 2013/0321806 A1 | 12/2013 | Kester et al. | |
| 2013/0341509 A1 | 12/2013 | Nelson et al. | |
| 2013/0342680 A1 | 12/2013 | Zeng et al. | |
| 2014/0002639 A1 | 1/2014 | Cheben et al. | |
| 2014/0139643 A1 | 5/2014 | Högasten et al. | |
| 2014/0320843 A1 | 10/2014 | Streuber et al. | |
| 2015/0136981 A1 | 5/2015 | Kester et al. | |
| 2015/0136982 A1 | 5/2015 | Kester et al. | |
| 2015/0138534 A1 | 5/2015 | Tidhar | |
| 2015/0144770 A1 | 5/2015 | Choi | |
| 2015/0226613 A1 | 8/2015 | Bauer et al. | |
| 2015/0288894 A1 | 10/2015 | Geelen et al. | |
| 2015/0316473 A1 | 11/2015 | Kester et al. | |
| 2016/0037089 A1 | 2/2016 | Silny et al. | |
| 2016/0041095 A1 | 2/2016 | Rothberg et al. | |
| 2016/0097713 A1 | 4/2016 | Kester et al. | |
| 2016/0238454 A1 | 8/2016 | Pillans | |
| 2016/0245698 A1 | 8/2016 | Pau et al. | |
| 2016/0313181 A1 | 10/2016 | Golub et al. | |
| 2016/0349228 A1 | 12/2016 | Kester et al. | |
| 2016/0356702 A1 | 12/2016 | Hinnrichs | |
| 2016/0380014 A1 | 12/2016 | Ganapathi et al. | |
| 2017/0026588 A1 | 1/2017 | Kester et al. | |
| 2017/0205290 A1 | 7/2017 | Kester et al. | |
| 2017/0234761 A1 | 8/2017 | Augusto | |
| 2017/0248517 A1 | 8/2017 | Scherer et al. | |
| 2017/0350758 A1 | 12/2017 | Kester et al. | |
| 2018/0077363 A1 | 3/2018 | Kester et al. | |
| 2018/0188163 A1 | 7/2018 | Kester et al. | |
| 2018/0191967 A1 | 7/2018 | Kester | |

FOREIGN PATENT DOCUMENTS

| | | |
|---|---|---|
| CA | 2 870 419 | 5/2015 |
| EP | 0 837 600 | 4/1998 |
| EP | 2 871 452 | 5/2015 |
| EP | 2 942 615 | 11/2015 |
| EP | 2 955 496 | 12/2015 |
| EP | 3 040 706 | 7/2016 |
| GB | 1014769 | 12/1965 |
| GB | 2518224 | 3/2015 |
| JP | 2013-128185 | 6/2013 |
| WO | WO 2004/097389 | 11/2004 |
| WO | WO 2007/008826 | 1/2007 |
| WO | WO 2008/109183 | 9/2008 |
| WO | WO 2009/094782 | 8/2009 |
| WO | WO 2010/053979 | 5/2010 |
| WO | WO 2012/078417 | 6/2012 |
| WO | WO 2012/082366 | 6/2012 |
| WO | WO 2013/173541 | 11/2013 |
| WO | WO 2015/108236 | 7/2015 |
| WO | WO 2016/196224 | 12/2016 |
| WO | WO 2017/201194 | 11/2017 |
| WO | WO 2018/075957 | 4/2018 |

(56) References Cited

FOREIGN PATENT DOCUMENTS

| WO | WO 2018/075964 | 4/2018 |
|----|----------------|--------|
| WO | WO 2018/156795 | 8/2018 |

OTHER PUBLICATIONS

Allen et al "Measurements of Methane Emissions at Natural Gas Production Sites in the United States", PNAS, Oct. 29, 2013, vol. 110, No. 44, pp. 7.

Alvarez et al., "Greater Focus Needed on Methane Leakage from Natural Gas Infrastructure", PNAS, Apr. 24, 2012, vol. 109, No. 17, pp. 12.

Bedard et al., "Image Mapping Spectrometry: Calibration and Characterization", Optical Engineering, Nov. 2012, vol. 51, No. 11, pp. 111711-1 - 111711-13.

Ben-David et al., "Probability Theory for 3-Layer Remote Sensing Radiative Transfer Model: Univariate Case," Optics Express, Apr. 2012, vol. 20, No. 9, pp. 10004-10033.

Ben-David et al., "Probability Theory for 3-Layer Remote Sensing Radiative Transfer Model: Errata," Optics Express, May 20, 2013, vol. 21, No. 10, pp. 11852.

Brady et al., "Multiscale Lens Design", Optics Express, Jun. 22, 2009, vol. 17, No. 13, pp. 10659- 10674.

Brochure provided by Lofty Designs to Rebellion Photonics on Oct. 31, 2012 as noted from the email. Subsequent to that date brochure was used in connection with potential customers.

Caulton et al., "Toward a Better Understanding and Quantification of Methane Emissions from Shale Gas Development", PNAS, Apr. 29, 2014, vol. 111, No. 17, pp. 7.

Chen et al., "Quantitative Sectioning and Noise Analysis for Structured Illumination Microscopy: Erratum", Optics Express, Oct. 19, 2015, vol. 23, No. 21, pp. 27633-27634.

Chidley et al., "Flow-Induced Birefringence: the Hidden PSF Killer in High Performance Injection-Molded Plastic Optics", Endoscopic Microscopy, Proceedings of SPIE vol. 6082, 2006, pp. 11.

Chu et al., "The NIST Quantitative Infrared Database", Journal of Research of the National Institute of Standards and Technology, Jan.-Feb. 1999, vol. 104, No. 1, pp. 59-81.

DiPietro et al., "Hyperspectral Matched Filter with False-Alarm Mitigation", Optical Engineering, Jan. 2012, vol. 51, No. 1, pp. 016202-1 - 016202-7.

"Directed Inspection and Maintenance at Gas Processing Plants and Booster Stations," United States Environmental Protection Agency Air and Radiation (6202J), EPA430-B-03-018, Oct. 2003 available at https://www3.epa.gov/gasstar/documents/ll_dimgasproc.pdf.

Eriksson et al., "Radiative Cooling Computed for Model Atmospheres", Applied Optics, Dec. 1, 1982, vol. 21, No. 23, pp. 4381-4388.

Flanigan, "Detection of Organic Vapors with Active and Passive Sensors: A Comparison," Applied Optics, 1986, vol. 25, No. 23, pp. 4253-4260.

Gålfalk et al., "Making Methane Visable", Nature Climate Change, Apr. 2016, vol. 6, pp. 426-430.

Gålfalk et al., "Making Methane Visable", Supplementary Information, Nature Climate Change, 2015, pp. 1-14.

Gallagher et al., "Error Analysis for Estimation of Trace Vapor Concentration Pathlength in Stack Plumes", Applied Spectroscopy, 2003, vol. 57, No. 6, pp. 614-621.

Gallagher et al., "Estimation of Trace Vapor Concentration-Pathlength in Plumes for Remote Sensing Applications from Hyperspectral Images", Analytica Chimica Acta, 2003, vol. 490, pp. 139-152.

Gao et al., "Compact Image Slicing Spectrometer (ISS) for Hyperspectral Fluorescence Microscopy", Optics Express, Jul. 20, 2009, vol. 17, No. 15, pp. 12293-12308.

Gao et al., "Depth-Resolved Image Mapping Spectrometer (IMS) with Structured Illumination", Optics Express, Aug. 29, 2011, vol. 19, No. 18, pp. 17439-17452.

Gao et al., "Optical Design of a Snapshot High-Sampling Image Mapping Spectrometer (IMS) for Hyperspectral Microscopy", Three-Dimensional and Multidimensional Microscopy:Image Acquisition and Processing XVII, Proceedings of SPIE vol. 7570, 2010, pp. 1-7.

Gao et al., "Quantitative Comparison Between Full-Spectrum and Filter-Based Imaging in Hyperspectral Fluorescence Microscopy", Journal of Microscopy, 2012, vol. 246, No. 2, pp. 113-123.

Gao et al., "Snapshot Image-Mapping Spectrometer for Hyperspectral Fluorescence Microscopy", Optics and Photonics News, Nov. 2010, vol. 21, No. 12, p. 50.

Gao et al., "Snapshot Image Mapping Spectrometer (Ims) with High Sampling Density for Hyperspectral Microscopy", Optics Express, Jul. 5, 2010, vol. 18, No. 4, pp. 14330-14344.

Gerhart et al., "Detection and Tracking of Gas Plumes in LWIR Hyperspectral Video Sequence Data," Algorithms and Technologies for Multispectral, Hyperspectral, and Ultraspectral Imagery XIX, 2013, SPIE Proceedings vol. 8743, pp. 1-14.

Gittins, Christopher M., "Detection and Characterization Of Chemical Vapor Fugitive Emissions by Nonlinear Optimal Estimation: Theory and Simulation", Applied Optics, Aug. 10, 2009, vol. 48, No. 23, pp. 4545-4561.

Goldberg et al., "Dual Band MWIR/LWIR Focal Plane Array Test Results," Army Research Lab, Adelphi, MD, Aug. 1999, pp. 18.

Golowich et al., "Performance Limits of LWIR Gaseous Plume Quantification", Algorithms and Technologies for Multispectral, Hyperspectral, and Ultraspectral Imagery XVII, 2011, Proceedings of SPIE vol. 8048, pp. 1-12.

Griffin et al., "The Herschel — SPIRE 1-15 Instrument and its In-Flight Performance," Astronomy and Astrophysics, Jul. 1, 2010, vol. 518, pp. 7.

Gross et al., "Remote Identification and Quantification of Industrial Smokestack Effluents via Imaging Fourier-Transform Spectroscopy", Environmental Science & Technology, 2010, vol. 44, No. 24, pp. 9390-9397.

Gupta et al., "Miniature Snapshot Multispectral Imager," Optical Engineering, 2011, vol. 50, pp. 033203-1 - 033203-9.

Hadlington, Simon, "New Camera Makes Methane Visible", Chemistry World, http://web.archive.org/web/20160305234907/http://www.rsc.org/chemistryworld/2015/12/methane-camera-infrared-greenhouse-gas, Dec. 14, 2015, pp. 2.

Hagen et al., "Analysis of Computed Tomographic Imaging Spectrometers. I. Spatial and Spectral Resolution", Applied Optics, Oct. 1, 2008, vol. 47, No. 28, pp. F85-F95.

Hagen et al., "Coded Aperture DUV Spectrometer for Standoff Raman Spectoscopy", Next-Generation Spectroscopic Technologies II, Proceedings of SPIE vol. 7319, 2009, pp. 1-10.

Hagen et al., "Compound Prism Design Principles, I", Applied Optics, Sep. 1, 2011, vol. 50, No. 25, pp. 4998-5011.

Hagen et al., "Compound Prism Design Principles, II: Triplet and Janssen Prisms", Applied Optics, Sep. 1, 2011, vol. 50, No. 25, pp. 5012-5022.

Hagen et al., "Compound Prism Design Principles, III: Linear-in-Wavenumber and Optical Coherence Tomography Prisms", Applied Optics, Sep. 1, 2011, vol. 50, No. 25, pp. 5023-5030.

Hagen et al., "Fourier Methods of Improving Reconstruction Speed for CTIS Imaging Spectrometers", Imagin Spectrometry XII, Proceedings of SPIE vol. 6661, 2007, pp. 11.

Hagen et al., "Foveated Endoscopic Lens", Journal of Biomedical Optics, Feb. 2012, vol. 17, No. 2, pp. 021104-1 - 021104-6.

Hagen et al., "Gaussian Profile Estimation in One Dimension", Applied Optics, Aug. 1, 2007, vol. 46, No. 22, pp. 5374-5383.

Hagen et al., "Gaussian Profile Estimation in Two Dimension", Applied Optics, Dec. 20, 2008, vol. 47, No. 36, pp. 6842-6851.

Hagen et al., "Quantitative Sectioning and Noise Analysis for Structured Illumination Microscopy", Optics Express, Jan. 2, 2012, vol. 20, No. 1, pp. 403-413.

Hagen et al., "Quantitative Sectioning and Noise Analysis for Structured Illumination Microscopy: Errata", Optics Express, Feb. 27, 2012, vol. 20, No. 5, pp. 5343.

Hagen et al., "Real-Time Quantitative Hydrocarbon Gas Imaging with the Gas Cloud Imager (GCI)", Proceedings of SPIE, vol. 8358, Chemical, Biological, Radiological, Nuclear, and Explosives (CBRNE) Sensing XIII, May 1, 2012, pp. 7.

(56) References Cited

OTHER PUBLICATIONS

Hagen et al., "Review of Snapshot Spectral Imaging Technologies", Optical Engineering, Sep. 2013, vol. 52, No. 9, pp. 090901-1 - 090901-23.

Hagen et al., "Snapshot Advantage: A Review of the Light Collection Improvement for Parallel High-Dimensional Measurement Systems," Optical Engineering, Jun. 13, 2012, vol. 51, No. 11, p. 111702-1 - 111702-7.

Hagen et al., "Snapshot Mueller Matrix Spectropolarimeter" Optics Letters, Aug. 1, 2007, vol. 32, No. 15, pp. 2100-2102.

Hagen et al., "Spectrally-Resolved Imaging of Dynamic Turbid Media", Multimodal Biomedical Imaging VI, Proceedings of SPIE vol. 7892, 2011, pp. 1-7.

Hagen et al., "Video-Rate Spectral Imaging of Gas Leaks in the Longwave Infrared," Chemical, Biological, Radiological, Nuclear, and Explosives (CBRNE) Sensing XIV, May 29, 2013, SPIE Proceedings vol. 8710, pp. 7.

Harley et al., "Remote Quantification of Smokestack Effluent Mass Flow Rates Using Imaging Fourier Transform Spectrometry," Chemical, Biological, Radiological, Nuclear, and Explosives (CBRNE) Sensing XII, Apr. 25-29, 2011, SPIE Proceedings vol. 8018, pp. 1-13.

Hayden et al., "Determination of Trace-Gas Amounts in Plumes by the Use of Orthogonal Digital Filtering of Thermal-Emission Spectra", Applied Optics, Jun. 1, 1996, vol. 35, No. 16, pp. 2802-2809.

Hirsch et al., "Detection of Gaseous Plumes in IR Hyperspectral Images Using Hierarchical Clustering", Applied Optics, Sep. 1, 2007, vol. 46, No. 25, pp. 6368-6374.

Johnston et al., "A Real-Time FPGA Implementation of a Barrel Distortion Correction Aglorithm", Projects, 2003, vol. 10, pp. 91-96.

Karion et al., "Methane Emissions Estimate from Airborne Measurements Over a Western United States Natural Gas Field", Geophysical Research Letters, 2013, vol. 40, pp. 4393-4397.

Keshava et al., "A Survey of Spectral Unmixing Algorithms", Lincoln Laboratory Journal, 2003, vol. 14, No. 1, pp. 55-78.

Kester et al., "A Real-Time Gas Cloud Imaging Camera for Fugitive Emission Detection and Monitoring", Imaging and Applied Optics Technical Digest, 2012, pp. 3.

Kester et al., "Development of Image Mappers for Hyperspectral Biomedical Imaging Applications", Applied Optics, Apr. 1, 2010, vol. 49, No. 10, pp. 1886-1899.

Kester et al., "High Numerical Aperture Microendoscope Objective for a Fiber Confocal Reflectance Microscope", Optics Express, Mar. 5, 2007, vol. 15. No. 5, pp. 2409-2420.

Kester et al., "Low Cost, High Performance, Self-Aligning Miniature Optical Systems", Applied Optics, Jun. 20, 2009, vol. 48, No. 18, pp. 3375-3384.

Kester et al., "Real-Time Snapshot Hyperspectral Imaging Endoscope", Journal of Biomedical Optics, May 2011, vol. 16, No. 5, pp. 056005-1 - 056005-12.

Kudenov et al., "Fourier Transform Channeled Spectropolarimetry in the MWIR", Optics Express, Oct. 1, 2007, vol. 15, No. 20, pp. 12792-12805.

Kudenov et al., "Snapshot Imaging Mueller Matrix Polarimeter Using Polarization Gratings", Optics Letters, Apr. 15, 2012, vol. 37, No. 8, pp. 1367-1369.

Landau et al., "Design and Evaluation of an Ultra-Slim Objective for *in-vivo*Deep Optical Biopsy", Optics Express, Mar. 1, 2010, vol. 18, No. 5, pp. 4758-4775.

Levi, Michael A., "Comment on 'Hydrocarbon Emissions Characterization in the Colorado Front Range: A Pilot Study' by Gabrielle Pétron et al.", Journal of Geophysical Research, 2012, vol. 117, No. D21203, pp. 1-5.

Levi, Michael a., "Reply to "Reply to 'Comment on 'Hydrocarbon Emissions Characterization in the Colorado Front Range —A Pilot Study' by Michael A. Levi"' by Gabrielle Pétron et al.", Journal of Geophysical Research: Atmospheres, 2013, vol. 118, pp. 3044-3046.

Low et al., "Remote Sensing and Characterization of Stack Gases by Infrared Spectroscopy. An Approach by Using Multiple-Scan Interferometry", Environmental Science & Technology, Jan. 1967, vol. 1, No. 1, pp. 73-74.

Luo et al., "Fast Processing of Imaging Spectrometer Data Cube Based on FPGA Design", MIPPR 2007: Multispectral Image Processing, Proceedings of SPIE vol. 6787, pp. 7.

Manolakis et al., "Long-Wave Infrared Hyperspectral Remote Sensing of Chemical Clouds", IEEE Signal Processing Magazine, Jul. 2014, vol. 31, No. 4, pp. 120-141.

Mathews, "Design and Fabrication of a Low-Cost, Multispectral Imaging System," Applied Optics, 2008, pp. F71-F76, vol. 47.

Naranjo et al., "IR Gas Imaging in an Industrial Setting," Thermosense XXXII, Published in SPIE Proceedings vol. 7661, May 4, 2010, pp. 1-8.

Nguyen et al., "Snapshot 3D Optical Coherence Tomography System using Image Mapping Spectrometer", Biomedical Optics and 3D Imaging OSA, 2012, pp. 3.

Niu et al., "New Approach to Remote Gas-Phase Chemical Quantification: Selected-Band Algorithm", Optical Engineering, Feb. 2014, vol. 53, No. 2, pp. 021111-1 - 021111-10.

"Oil and Natural Gas Sector Leaks", U.S. EPA Office of Air Quality Planning and Standards (OAQPS), Review Panel, Apr. 2014, pp. 63.

Pétron et al., "Hydrocarbon Emissions Characterization in the Colorado Front Range: A Pilot Study", Journal of Geophysical Research, 2012, vol. 117, No. D04304, pp. 1-19.

Pétron et al., "Reply to Comment on 'Hydrocarbon Emissions Characterization in the Colorado Front Range—A Pilot Study' by Michael A. Levi", Journal of Geophysical Research: Atmospheres, 2013, vol. 118, pp. 236-242.

Pisano et al., "Thermal Illuminators for Far-Infrared and Submillimeter Astronomical Instruments," Applied Optics, Jun. 1, 2005, vol. 44, No. 16, pp. 3208-3217.

Polak et al., "Passive Fourier-Transform Infrared Spectroscopy of Chemical Plumes: An Algorithm for Quantitiative Interpretation and Real-Time Background Removal", Applied Optics, Aug. 20, 1995, vol. 34, No. 24, pp. 5406-5412.

Rebellion Photonics, "Gas Cloud Imaging Camera: A Breakthrough in Leak Monitoring for the Rig & Refinery Safety Market", Presentation at SPIE Defense Security and Sensing, 28 pages., Apr. 29-May 3, 2013.

Sandsten et al., "Volume Flow Calculations on Gas Leaks Imaged with Infrared Gas-Correlation," Optics Express, 2012, vol. 20, No. 18, pp. 20318-20329.

Shogenji et al., "Multispectral Imaging Using Compact Compound Optics," Optics Express, Apr. 19, 2004, vol. 12, No. 8, pp. 1643-1655.

Telops, "Hyper-Cam", http://web.archive.org/web/20160608180941/http://www.telops.com/en/hyperspectral-cameras/hyper-cam as archived Jun. 8, 2016 in 2 pages.

Telops, "Innovative Infrared Imaging", http://web.archive.org/web/20160603212729/http://www.telops.com/en/ as archived Jun. 3, 2016 in 2 pages.

Walter Jr., et al., "Detection of Atmospheric Pollutants: A Correlation Technique", Applied Optics, Jun. 1975, vol. 14, No. 6, pp. 1423-1428.

Wikipedia entry https://en.wikipedia.org/wiki/Mobile_computing in 6 pages, last modified on Dec. 30, 2016; retrieved from the internet on Feb. 2, 2017.

Williams et al., "Dual-Band MWIR/LWIR Radiometer for Absolute Temperature Measurements," SPIE Thermosense Conference XXVIII— Manuscript 6205-23, Apr. 18, 2006, pp. 13.

Young et al., "An In-Scene Method for Atmospheric Compensation of Thermal Hyperspectral Data", Journal of Geophysical Research, 2002, vol. 107, No. D24, pp. 14-1 - 14-20.

Zheng et al., "A Static Multiplex Fabry-Perot Spectrometer", Sensors, Cameras, and Systems for Industrial/Scientific Applications X, Proceedings of SPIE-IS&T Electronic Imaging, SPIE vol. 7249, 2009, pp. 8.

Zheng et al., "Analytic-Domain Lens Design with Proximate Ray Tracing", Journal of the Optical Society of America A, Aug. 2010, vol. 27, No. 8, pp. 1791-1802.

(56) References Cited

OTHER PUBLICATIONS

Preliminary Amendment as filed in U.S. Appl. No. 14/538,827 dated Jan. 28, 2015 in 6 pages.
Office Action received in U.S. Appl. No. 14/538,827 dated Jun. 30, 2015 in 8 pages.
Non-Final Office Action Response as filed in U.S. Appl. No. 14/538,827 dated Dec. 28, 2015 in 11 pages.
Notice of Allowance received in U.S. Appl. No. 14/538,827 dated Feb. 1, 2016 in 18 pages.
Corrected Notice of Allowance received in U.S. Appl. No. 14/538,827 dated Feb. 10, 2016 in 4 pages.
Corrected Notice of Allowance received in U.S. Appl. No. 14/538,827 dated Feb. 22, 2016 in 4 pages.
Request for Continued Examination and Response to Correct Application Papers as filed in U.S. Appl. No. 14/538,827 dated Apr. 29, 2016 in 14 pages.
Notice of Allowance received in U.S. Appl. No. 14/538,827 dated May 26, 2016 in 9 pages.
Notice of Allowance received in U.S. Appl. No. 14/538,827 dated Sep. 19, 2016 in 9 pages.
Amendment as filed in U.S. Appl. No. 14/538,827 dated Dec. 16, 2016 in 9 pages.
Office Action received in U.S. Appl. No. 14/539,899 dated Mar. 26, 2015 in 6 pages.
Non-Final Office Action Response as filed in U.S. Appl. No. 14/539,899 dated Aug. 26, 2015 in 8 pages.
Final Office Action received in U.S. Appl. No. 14/539,899 dated Dec. 11, 2015 in 9 pages.
Amendment as filed in U.S. Appl. No. 14/539,899 dated Jun. 9, 2016 in 6 pages.
Notice of Allowance received in U.S. Appl. No. 14/539,899 dated Jun. 21, 2016 in 17 pages.
Notice of Allowance received in U.S. Appl. No. 14/539,899 dated Oct. 31, 2016 in 10 pages.
Amendment as filed in U.S. Appl. No. 14/539,899 dated Jan. 27, 2017 in 5 pages.
Issue Notification received in U.S. Appl. No. 14/539,899 dated Mar. 1, 2017 in 1 page.
Extended European Search Report received in European Application No. 14192862.2 dated Mar. 30, 2015 in 10 pages.
Official Communication received in European Application No. 14192862.2 dated Apr. 19, 2016 in 6 pages.
International Search Report in PCT Application No. PCT/US2013/041278 dated Aug. 27, 2013 in 4 pages.
International Preliminary Report on Patentability in PCT Application No. PCT/US2013/041278 dated Nov. 27, 2014 in 10 pages.
Preliminary Amendment as filed in U.S. Appl. No. 14/700,791 dated Jul. 13, 2015 in 8 pages.
Notice of Allowance received in U.S. Appl. No. 14/700,791 dated Jun. 9, 2016 in 11 pages.
Notice of Allowance received in U.S. Appl. No. 14/700,791 dated Sep. 30, 2016 in 19 pages.
Notice of Allowance received in U.S. Appl. No. 14/700,791 dated Feb. 21, 2017 in 20 pages.
Extended European Search Report received in European Application No. 15165877.0 dated Oct. 8, 2015 in 12 pages.
Official Communication received in European Application No. 15165877.0 dated Jan. 3, 2017 in 9 pages.
Preliminary Amendment as filed in U.S. Appl. No. 14/700,567 dated Jul. 10, 2015 in 6 pages.
Publication Request as filed in U.S. Appl. No. 14/700,567 dated Aug. 24, 2016 in 237 pages.
Extended European Search Report received in European Application No. EP 15165880.4 dated Nov. 24, 2015 in 8 pages.
Preliminary Amendment as filed in U.S. Appl. No. 14/792,477 dated Dec. 21, 2015 in 7 pages.
Preliminary Amendment as filed in U.S. Appl. No. 15/166,092 dated Aug. 15, 2016 in 7 pages.
International Search Report in PCT Application No. PCT/US2016/034455 dated Oct. 24, 2016 in 12 pages.
Amendment as filed in U.S. Appl. No. 14/700,567 dated Dec. 13, 2017 in 12 pages.
Amendment as filed in U.S. Appl. No. 14/792,477 dated Jan. 18, 2018 in 10 pages.
Amendment as filed in U.S. Appl. No. 15/418,532 dated Nov. 22, 2017 in 8 pages.
Amendment as filed in U.S. Appl. No. 15/462,352 dated Feb. 28, 2018 in 5 pages.
International Search Report in PCT Application No. PCT/US2017/057712 dated Mar. 6, 2018 in 12 pages.
International Search Report in PCT Application No. PCT/US2017/057725 dated Feb. 14, 2018 in 14 pages.
Invitation to Pay Additional Fees in PCT Application No. PCT/US2017/057712 dated Jan. 10, 2018 in 2 pages.
Notice of Allowance received in U.S. Appl. No. 15/623,942 dated Jan. 24, 2018 in 22 pages.
Official Communication received in U.S. Appl. No. 14/700,567 dated Mar. 5, 2018 in 38 pages.
Official Communication received in U.S. Appl. No. 14/792,477 dated Jul. 19, 2017 in 20 pages.
Official Communication received in U.S. Appl. No. 15/418,532 dated Dec. 11, 2017 in 21 pages.
Official Communication received in U.S. Appl. No. 15/418,532 dated Jun. 23, 2017 in 7 pages.
Official Communication received in U.S. Appl. No. 15/462,352 dated Sep. 28, 2017 in 6 pages.
Preliminary Amendment as filed in U.S. Appl. No. 15/623,942 dated Dec. 7, 2017 in 6 pages.
Preliminary Amendment as filed in U.S. Appl. No. 15/789,811 dated Mar. 20, 2018 in 6 pages.
Preliminary Amendment as filed in U.S. Appl. No. 15/789,829 dated Mar. 20, 2018 in 8 pages.
Sandsten et al., "Development of Infrared Spectroscopy Techniques for Environmental Monitoring", Doctoral Thesis, Aug. 2000, pp. 123.
Sandsten et al., "Real-Time Gas-Correlation Imaging Employing Thermal Background Radiation", Optics Express, Feb. 14, 2000, vol. 6, No. 4, pp. 92-103.
Cossel et al., "Analysis of Trace Impurities in Semiconductor Gas Via Cavity-Enhanced Direct Frequency Comb Spectroscopy", Applied Physics B, Sep. 2010, vol. 100, No. 4, pp. 917-924.
Official Communication received in U.S. Appl. No. 15/166,092 dated May 15, 2018 in 30 pages.
Official Communication received in U.S. Appl. No. 15/789,829 dated Jun. 5, 2018 in 16 pages.
Corrected Notice of Allowance received in U.S. Appl. No. 15/418,532 dated Jul. 6, 2018 in 3 pages.
International Search Report in PCT Application No. PCT/US2018/019271 dated Jun. 27, 2018 in 15 pages.
Notice of Allowance received in U.S. Appl. No. 14/792,477 dated Apr. 19, 2018 in 13 pages.
Notice of Allowance received in U.S. Appl. No. 15/418,532 dated Jun. 15, 2018 in 12 pages.
Notice of Allowance received in U.S. Appl. No. 15/462,352 dated Jul. 17, 2018 in 25 pages.
Official Communication received in European Application No. 14192862.2 dated May 2, 2018 in 3 pages.
Official Communication received in U.S. Appl. No. 15/789,811 dated Jul. 27, 2018 in 22 pages.
Official Communication received in European Application No. 13732285.5 dated Jul. 26, 2018 in 6 pages.
International Preliminary Report on Patentability in PCT Application No. PCT/US2016/034455 dated Dec. 5, 2017 in 8 pages.
Invitation to Pay Additional Fees in PCT Application No. PCT/US2017/057725 dated Dec. 14, 2017 in 3 pages.
Office Action received in U.S. Appl. No. 14/543,692 dated Nov. 3, 2015 in 7 pages.
Interview Summary received in U.S. Appl. No. 14/543,692 dated Feb. 17, 2016 in 5 pages.
Response to Office Action as filed in U.S. Appl. No. 14/543,692 dated May 2, 2016 in 9 pages.
Office Action received in U.S. Appl. No. 14/543,692 dated Jun. 1, 2016 in 18 pages.

(56) References Cited

OTHER PUBLICATIONS

Response to Final Action as filed in U.S. Appl. No. 14/543,692 dated Nov. 30, 2016 in 12 pages.
Notice of Allowance received in U.S. Appl. No. 14/543,692 dated Dec. 9, 2016 in 12 pages.
Amendment after Allowance as filed in U.S. Appl. No. 14/543,692 dated Mar. 3, 2017 in 6 pages.
Notice of Allowance received in U.S. Appl. No. 14/543,692 dated Mar. 17, 2017 in 4 pages.
Comments on Allowance received in U.S. Appl. No. 14/700,791 dated May 19, 2017 in 2 pages.
Notice of Allowance received in U.S. Appl. No. 14/700,791 dated Jul. 10, 2017 in 24 pages.
Official Communication received in U.S. Appl. No. 14/700,567 dated Jun. 14, 2017 in 29 pages.
Official Communication received in U.S. Appl. No. 14/792,477 dated Jan. 27, 2017 in 10 pages.
Response to Restriction Requirement submitted in U.S. Appl. No. 14/792,477 dated May 8, 2017 in 6 pages.

* cited by examiner

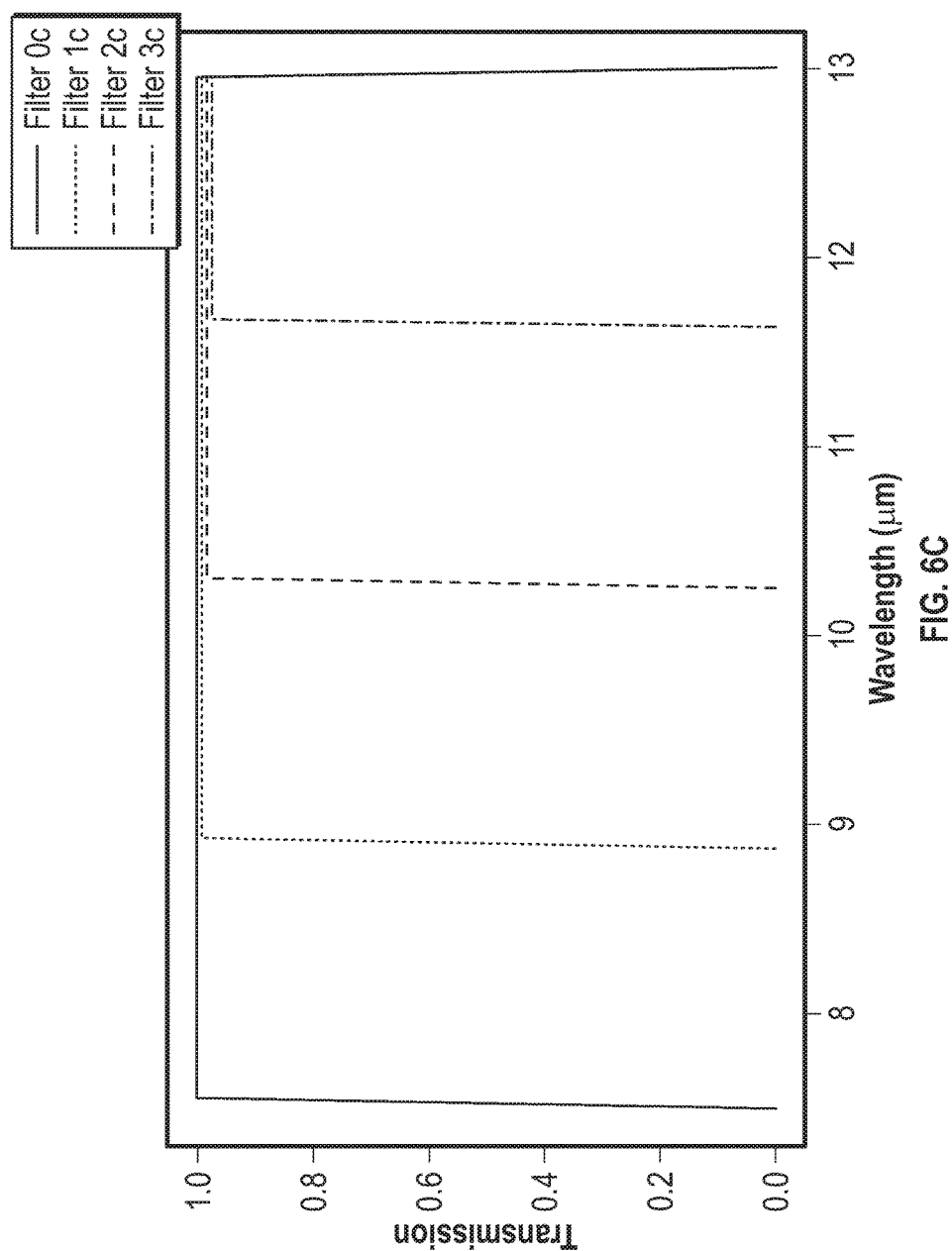

DIVIDED-APERTURE INFRA-RED SPECTRAL IMAGING SYSTEM FOR CHEMICAL DETECTION

CROSS-REFERENCE TO RELATED APPLICATIONS

This application is a continuation of U.S. patent application Ser. No. 14/543,692, filed on Nov. 17, 2014, which is a continuation of International Application No. PCT/US2013/041278, filed on May 16, 2013 which claims benefit of and priority from the U.S. Provisional Application Nos. 61/688,630 filed on May 18, 2012 and titled "Divided Aperture Infrared Spectral Imager (DAISI) for Chemical Detection", and 61/764,776 filed on Feb. 14, 2013 and titled "Divided Aperture Infrared Spectral Imager for Chemical Detection". The disclosure of each of the above-mentioned applications is incorporated by reference herein in its entirety.

TECHNICAL FIELD

The present invention generally relates to a system and method for gas cloud detection and, in particular, to a system and method of detection of spectral signatures of chemical compositions in a mid- and long-wave infrared spectral region with a use of systemic compensation for parallax-induced and motion-induced imaging artifacts.

BACKGROUND

Most of the existing IR spectral imaging systems require focal plane detector arrays (FPAs) that have to be highly sensitive and cooled in order to compensate, during the optical detection, for the reduction of the photon flux caused by spectrum-scanning operation. There remains a need, therefore, in a system enabling an optical data acquisition mode that does not require the cooling of the used detector(s), which detectors can be less sensitive to photons in the IR but yet well fit for continuous monitoring applications. There also remains a need in an IR imaging system the operation of which is substantially not susceptible to motion artifacts (which is a common problem with spectrally-scanning systems causing errors in either the spectral data, spatial data, or both).

SUMMARY

Embodiments of the present invention provide an infrared (IR) imaging system for determining a concentration of a target species in an object. The imaging system includes (i) an optical system, having an optical focal plane array (FPA) unit that is devoid of a cooling means, which optical system is configured to receive IR radiation from the object along at least two optical channels defined by components of the optical system, said at least two optical channels being spatially and spectrally different from one another; (ii) first and second temperature-controlled shutters removably positioned to block IR radiation incident onto the optical system from the object; and (iii) a processor configured to acquire multispectral optical data representing said target species from the received IR radiation in a single occurrence of data acquisition. The optical system may include an optical aperture (a boundary of which is defined to circumscribe, encompass said at least two spatially distinct optical channels) and at least two spectrally-multiplexed optical filters. Each of these optical filters is positioned to transmit a portion of the IR radiation received in a respectively corresponding optical channel from the at least two spatially and spectrally different optical channels and includes at least one of a longpass optical filter and a shoilpass optical filter (with or without a combination with another filter such as a notch filter, for example). The optical system may further include at least two reimaging lenses, each reimaging lens disposed to transmit IR radiation (in one embodiment—between about 1 micron and about 20 microns), that has been transmitted through a corresponding optical filter towards the optical FPA unit. In one embodiment, the optical FPA unit is positioned to receive IR radiation from the object through the at least two reimaging lenses to form respectively-corresponding two or more sets of imaging data representing the object and the processor is configured to acquire said optical data from the two or more sets of imaging data.

Embodiments of the present invention additionally provide a method for operating an infrared (IR) imaging system. The method includes receiving IR radiation from an object along at least two optical channels defined by components of an optical system of the IR imaging system, which at least two optical channels arc spatially and spectrally different from one another. The method further includes transmitting the received IR radiation towards an optical focal plane array (FPA) unit that is not being cooled in the course of normal operation; and removably positioning at least one of at least two temperature-controlled shutters in front of the optical system to block IR radiation incident onto the optical system from the object.

BRIEF DESCRIPTION OF THE DRAWINGS

The invention will be more fully understood by referring to the following Detailed Description in conjunction with the Drawings, of which:

FIG. 6C shows theoretical plots of transmission characteristics of spectrally multiplexed long-pass filter combination used in an embodiment of the invention.

DETAILED DESCRIPTION

Figure 1:
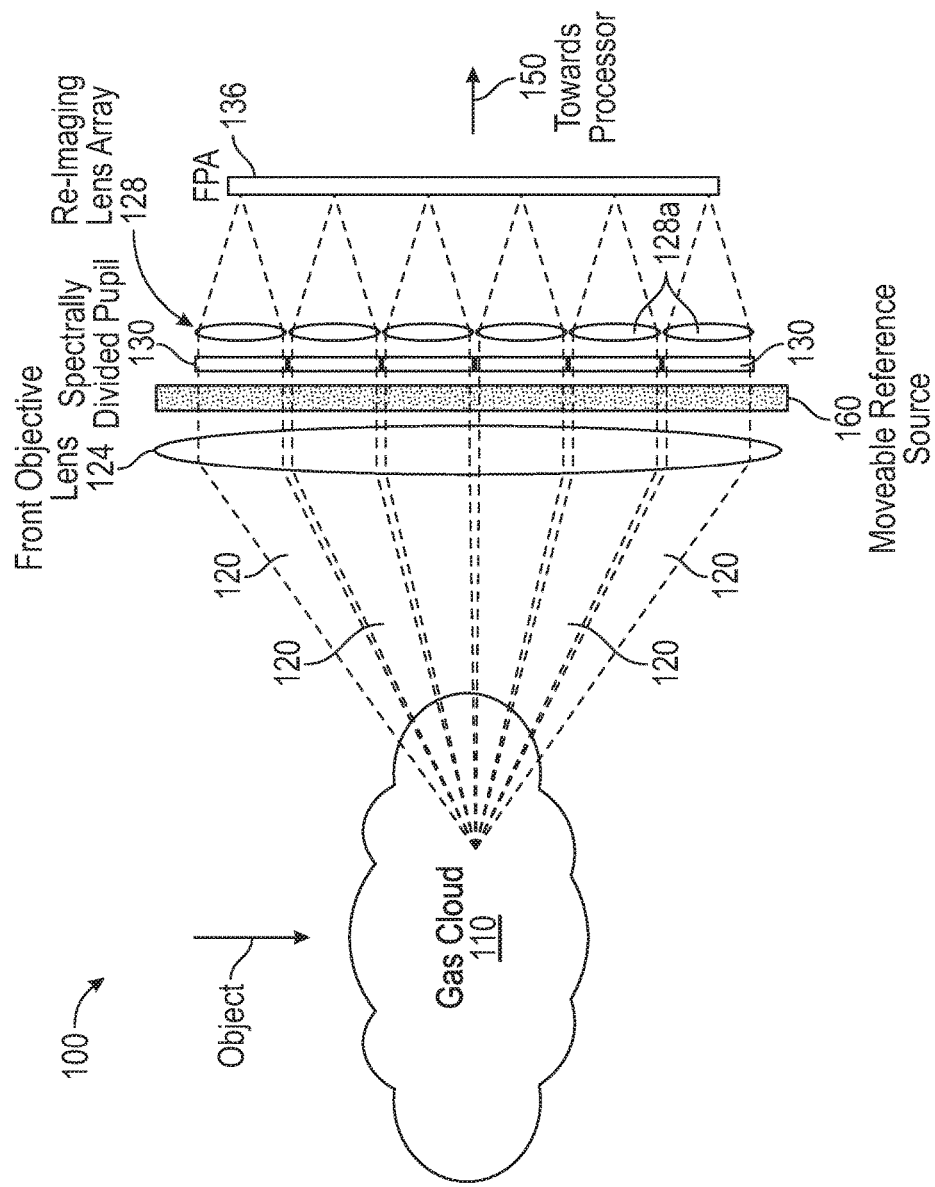
FIG. 1 shows an embodiment of the system of the invention utilizing a common front objective lens that has a pupil divided spectrally and re-imaged onto an infrared FPA.

Embodiments of the present invention illustrate a divided-aperture infrared spectral imaging (DAISI) system that is structured and adapted to provide identification of target chemical contents of the imaged scene based on spectrally-multiplexed operation and single-shot (also referred to as snapshot), that is devoid of spectral and spatial scanning acquisition of infrared (IR) spectral signatures of the target chemical contents with an TR detector (such as, for example, infrared focal plane array or FPA) to form a spectral cube of imaging data. In contradistinction to commonly used IR imaging systems, the DAISI system does not require cooling.

Implementations of the present invention provide several operational advantages over existing IR spectral imaging systems, most if not all of which require FPAs that have to be highly sensitive and cooled in order to compensate, during the optical detection, for the reduction of the photon flux caused by spectrum-scanning operation. The highly sensitive and cooled FPA systems are expensive and require a great deal of maintenance. As an embodiment of the invention is configured to operate in single-shot acquisition mode, the instrument receives photons from every point of the object substantially simultaneously, during the single reading. In comparison with a system of related art, this feature enables an embodiment to collect a substantially greater amount of optical power from the imaged scene (for example, an order of magnitude more photons) at any given moment in time. Consequently, an embodiment is enabled to operate using uncooled detector(s) (for example, FPA such as an array of microbolometers) that are less sensitive to photons in the IR but are well fit for continuous monitoring applications since they are capable of operating in extreme weather conditions, require less power, can operate both day and night, and are less expensive. On the other hand, embodiments of the invention are advantageous in that their operation is substantially immune to motion artifacts (which is a common problem with spectrally-scanning systems causing errors in either the spectral data, spatial data, or both). Moreover, present embodiments are structured to acquire spectrally-multiplexed datacubes during a single-shot acquisition which, when combined with the detector-noise limited performance of the FPA's, result in increase of level of the detected signal by a factor of 2 to 10 times, as compared with the systems of related art.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In the drawings like numbers are used to represent the same or similar elements wherever possible. The depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The invention as recited in claims appended to this disclosure is intended to be assessed in light of the disclosure as a whole, including features disclosed in prior art to which reference is made.

FIG. 1 provides a diagram schematically illustrating a spatial and spectral division of incoming light by an embodiment 100 of the system of the invention (also referred to as DAISI system) that is enabled to image an object 110 possessing IR spectral signature(s). An aperture of the system (associated with a front objective lens system 124) is spatially and spectrally divided. The spatial and spectral division of the aperture into distinct aperture portions corresponding to separate channels 120 (in object space and/or image space) along which light propagates through the aperture is enabled with the use of an array 128 of re-imaging lenses 128a and an array of spectral filters 130, which respectively correspond to the distinct channels 120. In one implementation, the distinct channels 120 may include optical channels that are separated in angular space. The array of spectral filters 130 may additionally include a filter-holding aperture mask (containing, for example, IR light-blocking materials such as ceramic, metal, or plastic). Light from the object 110 (such as a cloud of gas, for example), the optical properties of which in the IR are described by a unique absorption, reflection and/or emission spectrum, is received by the aperture of the system through each of the channels 120 and is further imaged onto an optical detector component 136 (which may include at least one FPA). Each of the re-imaging lenses 128a is spatially aligned with a respectively-corresponding region of the divided aperture and, therefore, with respectively-corresponding spatial channel 120 to form, on the FPA component 136 a single sub-image of the object 110. Generally, two or more sub-images of the object can be characterized by close or substantially equal spectral signatures. The FPA component 136 is further operably connected with a processor 150 (not shown) specifically programmed to aggregate the data acquired with the system 100 into a spectral datacube representing, in spatial (x, y) and spectral (λ) coordinates an overall spectral image of the object 110 within the spectral region defined by the combination of the filters 130. Additionally, the processor 150 may be optionally and specifically programmed to determine the unique absorption characteristic of the object 110 and, alternatively or in addition, map the overall image datacube into a cube of data representing spatial distribution of concentrations c of targeted chemical components within the field of view associated with the object 110.

In order to facilitate the operational performance of the embodiment 100, an optional moveable temperature-controlled reference target 160 (including, for example, a shutter system containing two reference shutters maintained at different temperatures) is removably and, in one implementation, periodically inserted into an optical path of light traversing the system 100 from the object 110 to the FPA component 130 along at least one of the channels 120 to block such optical path and to provide a reference IR spectrum required to recalibrate the operation of the system 100 in real time. The configuration of the moveable reference(s) 160 is further discussed below.

In the embodiment 100, the front objective lens system 124 is shown to include a single front objective lens positioned to establish a common field-of-view (FOV) for the reimaging lenses 128a and to define an aperture stop for the whole system (which, in this specific case, substantially spatially coincides with limiting apertures corresponding to different optical channels 120). As a result, the positions for spectral encoding of the different optical channels 120 coincide with the position of the aperture stop of the whole system, which is defined as a surface between the lens system 124 and the array 128 of the reimaging lenses 128a. Generally, however, the field apertures corresponding to different optical channels may be located in different planes. In one implementation the field apertures corresponding to different optical channels are located in different planes, which planes are optical conjugates of one another (as defined by the whole optical system). Similarly, while all of the spectral filters 130 of the embodiment 100 are shown to lie in one plane, generally spectral filters corresponding to different optical filters can be associated with different planes. In one implementation, different spectral filters 130 are situated in different planes that are optically conjugate to one another.

Figure 2:
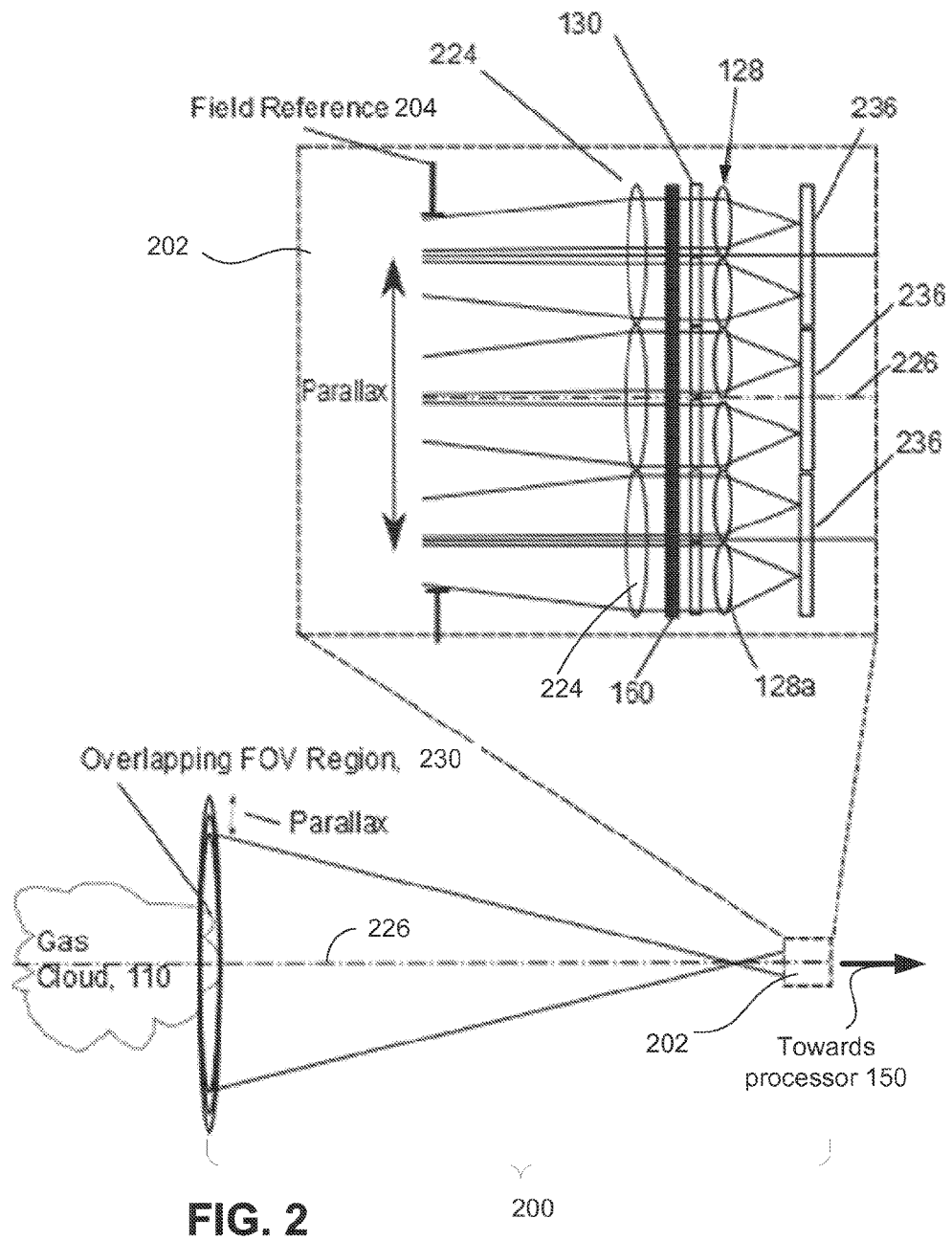
FIG. 2 shows an embodiment with a divided front objective lens and an array of infrared sensing FPAs.

The front objective lens element of the system can generally include an array of front objective lenses configured across the TR wavefront emitted by the object being imaged with the DAISI system such as to divide such wavefront spatially in a non-overlapping fashion. To this end, FIG. 2 illustrates a related embodiment 200, in which a front optical portion contributing to the spatial division of the aperture of the system is defined by a multiplicity of objective lenses 224 configured as a two-dimensional (2D) array of lenses. FIG. 2 presents a general view of the system 200 and, in figure insert, a portion 202 of it in greater detail, including a field reference (aperture stop) 204. The configuration 200 has an operational advantage over embodiment 100 of FIG. 1 in that the overall size and/or weight and/or cost of manufacture of the embodiment 200 is critically reduced while the associated parallax (the change in the FOVs of individual lenses 224 of the lens-array disposed across and substantially perpendicularly to a general optical axis 226 of the embodiment 200; marked as 228) is substantially small. As the distance between the portion 202 and the object 110 increases, the overlapping region 230 between the FOVs of the individual lenses 224 increases while the amount of parallax 228 remains approximately the same, thereby reducing its effect on the system 200. When the ratio of the parallax-to-object-distance is substantially equal to the pixel-size-to-system-focal-length ratio then the parallax effect may be considered to be negligible and, for practical purposes, no longer distinguishable. While the lenses 224 are shown to be disposed substantially in the same plane, optionally the array of front objective lenses such as lenses 224 can be defined in more than one plane. For example, some of the individual lenses 224 can be displaced with respect to some other individual lenses 224 along the axis 226 (not shown). It is noted that when multiple detectors 236 are employed with the embodiment 200, the embodiment is preferably complemented with field reference 204 to operate properly, as discussed below.

In one implementation, the front objective lens system such as the array of lenses 224 is configured as an array of lenses integrated or molded in association with a monolithic substrate, thereby reducing the costs and complexity otherwise accompanying the optical adjustment of individual lenses within the system. An individual lens 224 can optionally include a lens with varying magnification. As one example, a pair of thin and large diameter Alvarez plates can be used to define at least a portion of the front objective lens system.

In further reference to FIG. 1, the FPA component configured to receive the optical data representing spectral signature(s) of the imaged object can be configured as a single FPA 136 adapted to acquire more than one sub-image (formed along more than one optical channel 120) simultaneously. Alternatively, the detector component may include a set of optical FPAs at least one of which can be configured to acquired more than one spectrally distinct sub-image of the imaged object (For example, as shown in the embodiment 200 of FIG. 2, an array of optical FPAs can include FPAs 236 the number of which may correspond to the number of the front objective lenses 224). In one implementation of the system, an array of optical FPAs includes an array of microbolometers. The use of multiple microbolometers advantageously allows for an inexpensive way to increase the total number of detection elements (i.e. pixels) for recording of the datacube in one snapshot. An array of microbolometers more efficiently utilizes the detector pixels for each FPA as the number of unused pixels is minimized and/or eliminated between the sub-images that may exist when using a single microbolometer.

Figure 3A:
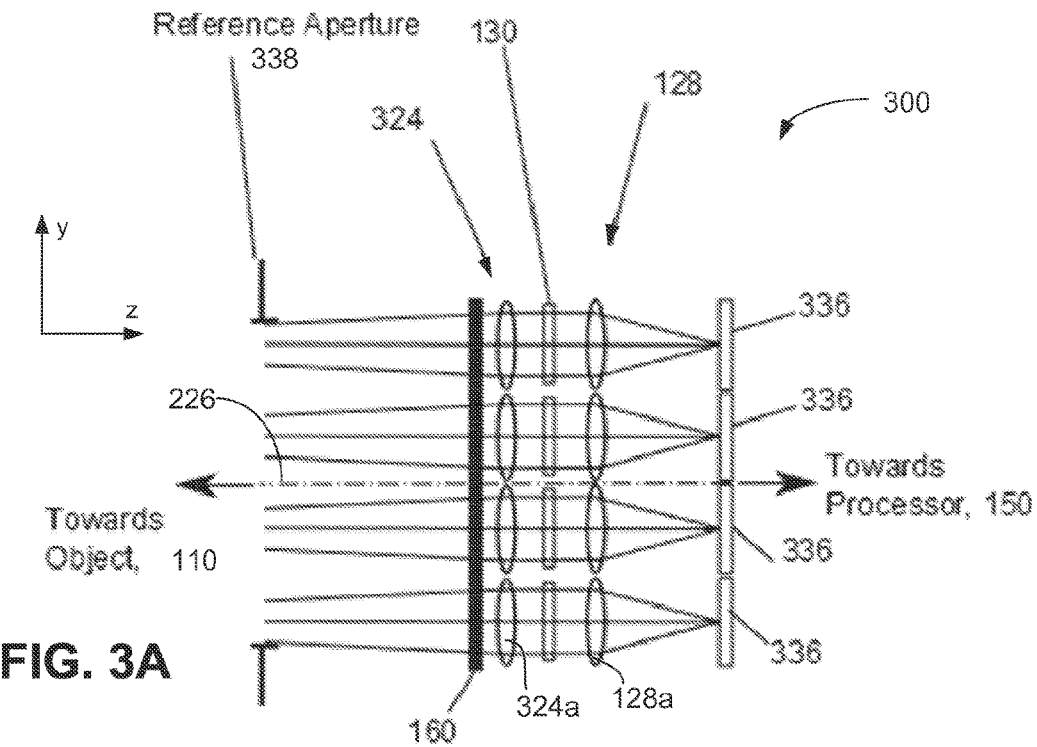
FIG. 3A represents an embodiment employing an array of front objective lenses operably matched with the re-imaging lens array.
Figure 3B:
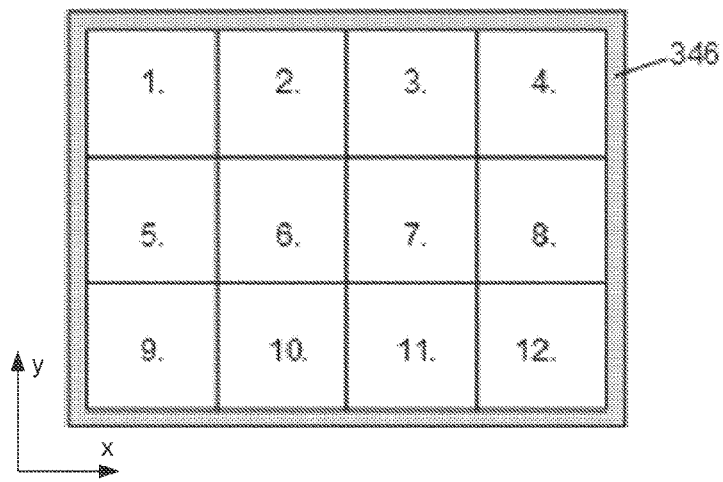
FIG. 3B illustrates a two-dimensional array of optical components corresponding to the embodiment of FIG. 3A.

FIG. 3A illustrates schematically a related embodiment 300 of the imaging system of the invention, in which the number of the front objective lenses 324a in the lens array 324, the number of re-imaging lenses 128a in the lens array 128, and the number of FPAs 336 are the same. So configured, each combination of respectively corresponding front objective lens 324, re-imaging lens 128a, and FPA 336 defines an individual imaging channel associated with acquisition of the IR light transmitted from the object 110 through an individual optical filter component 130. A field reference 338 of the system 300 is configured to have a uniform temperature across its surface and be characterized by a predetermined spectral curve of radiation emanating therefrom. The filed reference 338 is used for dynamically adjusting the data output from each FPA 336 after acquisition of light from the object 110 to ensure that output of each of the FPAs 336 represents correct acquired data, with respect to the other FPAs 336 for analysis, as discussed below in more detail. In one implementation, when a 4×3 array 340 of optical components (lenses 324a, 128a; detector elements 336), shown schematically in FIG. 3B, is used behind the temperature controlled reference target 160, the field reference 338 is adapted to obscure and/or block a peripheral portion of the bundle of light propagating from the object 110 towards the detector(s) 336. As a result, the field reference 338 obscures and/or blocks the border or peripheral portion(s) of the images of the object 110 formed on the FPA elements located along the perimeter 346 of the detector system. Generally, two detector elements will be producing substantially equal values of digital counts when they are used to observe the same portion of the scene in the same spectral region using the same optical train. If any of these input parameters (scene to be observed, spectral content of light from the scene, or optical elements delivering light from the scene to the two detector elements) differ, the counts associated with the detectors will differ as well. Accordingly, and as an example, in a case when the two FPAs 336 (such as those denoted as #6 and #7 in FIG. 3B) remain substantially un-obscured by the field reference 338, the outputs from these FPAs can be dynamically adjusted to the output from one of the FPAs located along border (such as, for example, the FPA element #2) that processes spectrally similar light.

Figure 4:
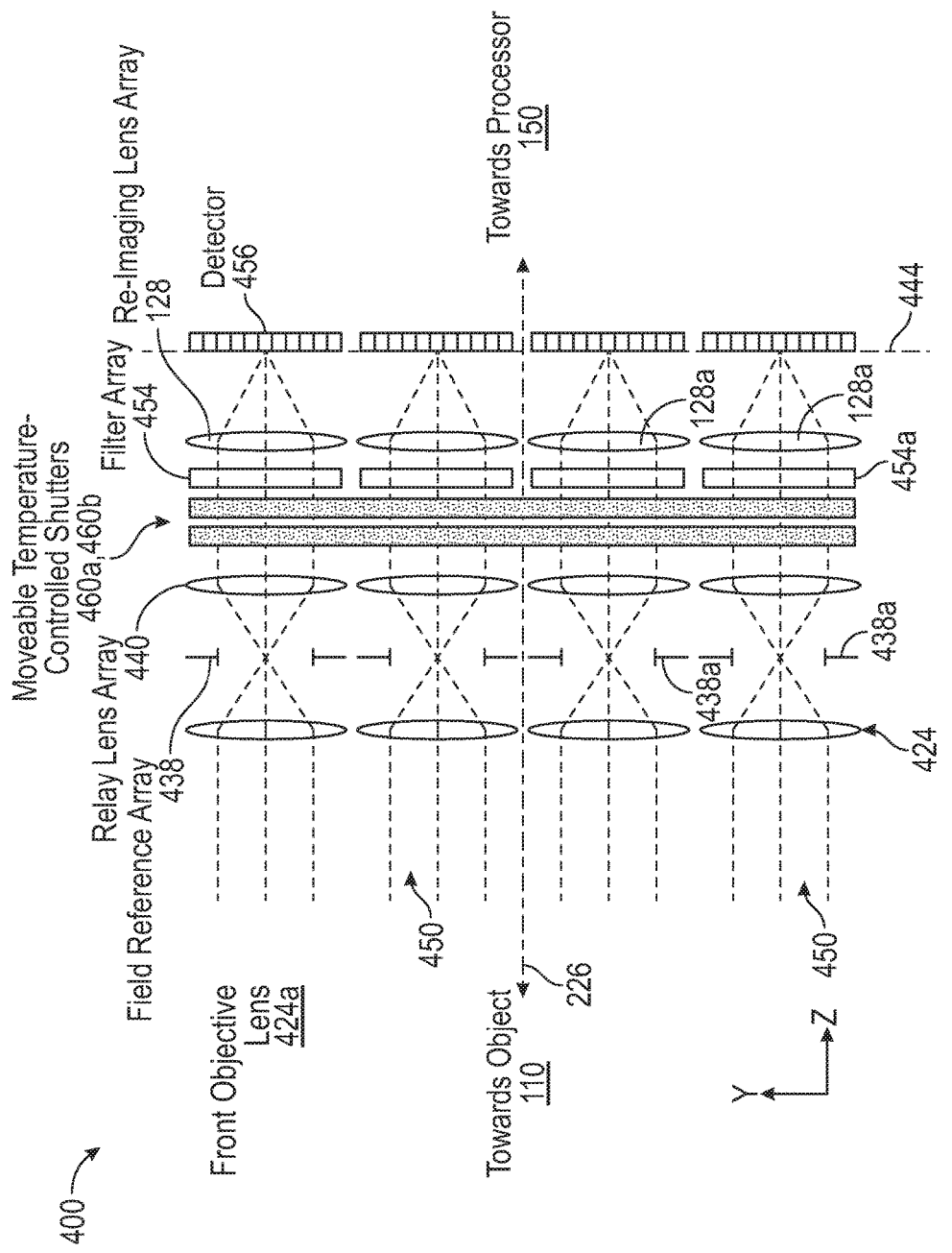
FIG. 4 is a diagram of the embodiment employing an array of field references and an array of respectively corresponding relay lenses.

FIG. 4 illustrates schematically a portion of another embodiment 400 that contains an array 424 of front objective lenses 424a adapted to receive light from the object 110 that relay the received light to the array 128 of re-imaging lenses 128a through an array 438 of field references (field stops) 438a the spectral characteristics of which are known, and through an array 440 of the relay lenses. The field references 438a are disposed at corresponding intermediate image planes defined, with respect to the object 110, by respectively corresponding front objective lenses 424a. (When refractive characteristics of all of the front objective lenses 424a are substantially the same, all of the field references 438a are disposed in the same plane). A field reference 438a of the array 438 obscures (casts a shadow on) a peripheral region of a corresponding sub-image formed at the detector plane 444 through a respectively corresponding spatial imaging channel 450 of the system 400 prior to such sub-image being spectrally processed by the processor 150. The array 440 of relay lenses then transmits light along each of the imaging channels 450 through different spectral filters 454a of the filter array 454, past the two-point calibration apparatus that includes two temperature controlled shutters 460a, 460b, and then onto the detector module 456 (a microbolometer array or other IR FPA).

The embodiment 400 commissions several operational advantages. It is configured to provide a spectrally known object within every sub-image and for every snapshot acquisition which can be calibrated against. (Such spectral certainty is expedient when using an array of IR FPAs like microbolometers the detection characteristics of which can change from one imaging frame to the next due to, in part, changes in the scene being imaged as well as the thermal effects caused by neighboring FPAs.) In addition, the field reference array 438 of the embodiment 400 is preferably—but not necessarily—disposed within the Rayleigh range (~the depth of focus) associated with the front objective lenses 424, thereby removing unusable blurred pixels due to having the field reference outside of this range. Moreover, the embodiment 400 is more compact then, for example, the configuration 300 of FIG. 3A (which requires the employed field reference 338 to be separated from the lens array 324 by a distance greater than several (for example, five) focal lengths to minimize blur contributed by the field reference to an image formed at a detector plane.

In another related embodiment (not shown in FIGS. 1, 2, 3A, and 4), the multi-optical FPA unit of the IR imaging system of the invention additionally includes an FPA configured to operate in a visible portion of the spectrum. In reference to FIG. 1, for example, an image of the scene of interest formed by such visible-light FPA may be used as a background to form a composite image by overlapping (whether virtually, with the use of a processor and specifically-designed computer program product enabling such data processing, or actually, by a viewer) an IR image (that is created based on the image data acquired by the individual FPAs 130) with the visible-light image. The so-formed composite image facilitates the identification of the precise spatial location of the target species the spectral signatures of which the system of the invention is enabled to detect and recognize.

Optical Filters.

Figures 5A, 5B:
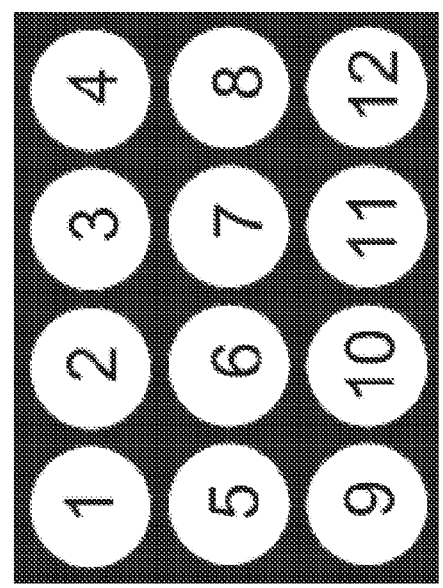
FIG. 5A is a diagram of a 4-by-3 pupil array of circular optical filters (and IR blocking material among them) used to spectrally divide an optical wavefront imaged with an embodiment of the invention.
FIG. 5B is a diagram of a 4-by-3 pupil array of rectangular optical filters (and IR blocking material among them) used to spectrally divide an optical wavefront imaged with an embodiment of the invention.

It is appreciated that the optical filters, used with an embodiment of the system, that define spectrally-distinct IR sub-images of the object can employ absorption filters, interference filters, and Fabry-Perot etalon based filters, to name just a few. When interference filters are used, the image acquisition through an individual imaging channel defined by an individual reimaging lens (such as a lens 128a of FIGS. 1, 2, 3, and 4) may be carried out in a single spectral bandwidth or multiple spectral bandwidths. Referring again to the embodiments 100, 200, 300, 400 of FIGS. 1 through 4, and in further reference to FIG. 3B, examples of a 4-by-3 array of spectral filters 130 is shown in FIGS. 5A, 5B, where individual filters 1 through 12 are juxtaposed with a supporting opto-mechanical element (not shown) to define a filter-array plane that is oriented, in operation, substantially perpendicularly to the general optical axis 226 of the embodiment.

Figure 6A:
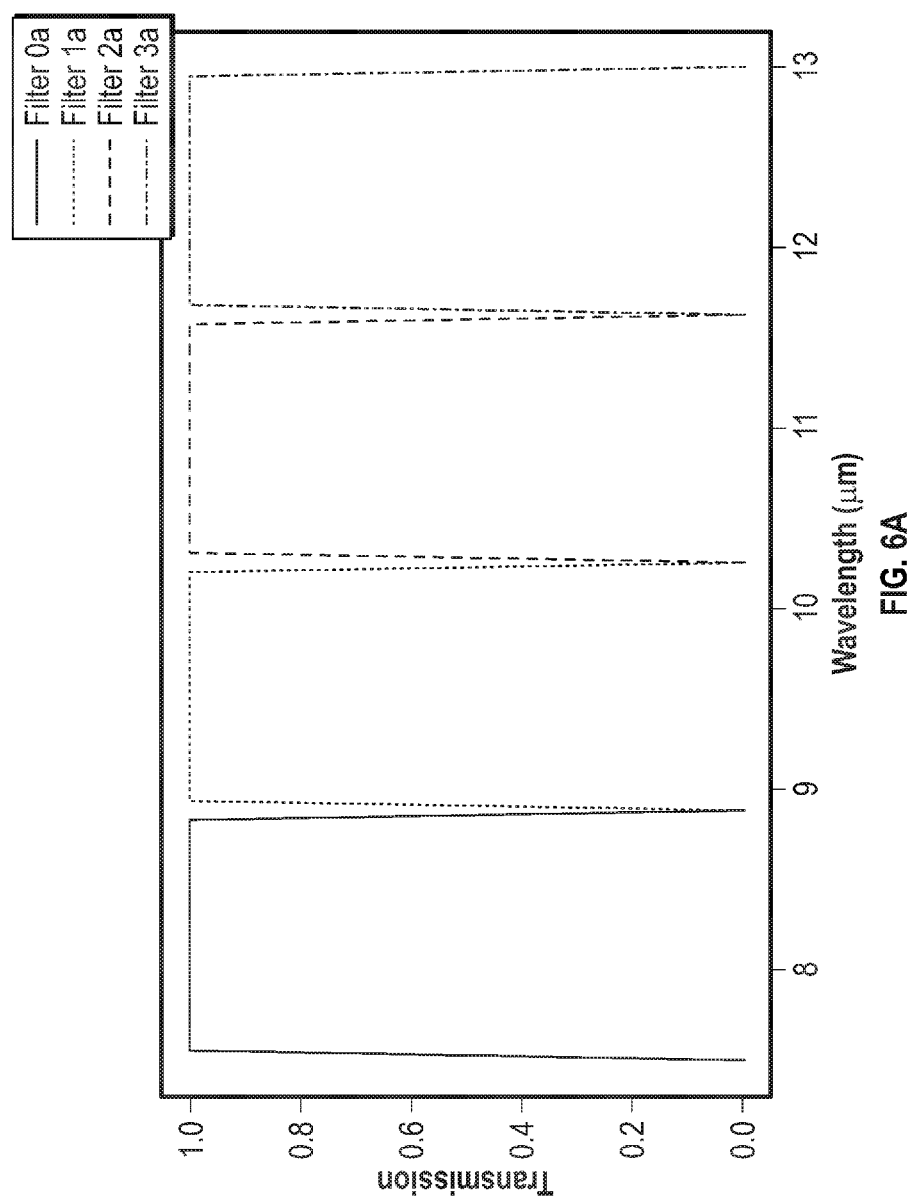
FIG. 6A depicts theoretical plots of transmission characteristics of a combination of band-pass filters used with an embodiment of the invention.
Figure 6B:
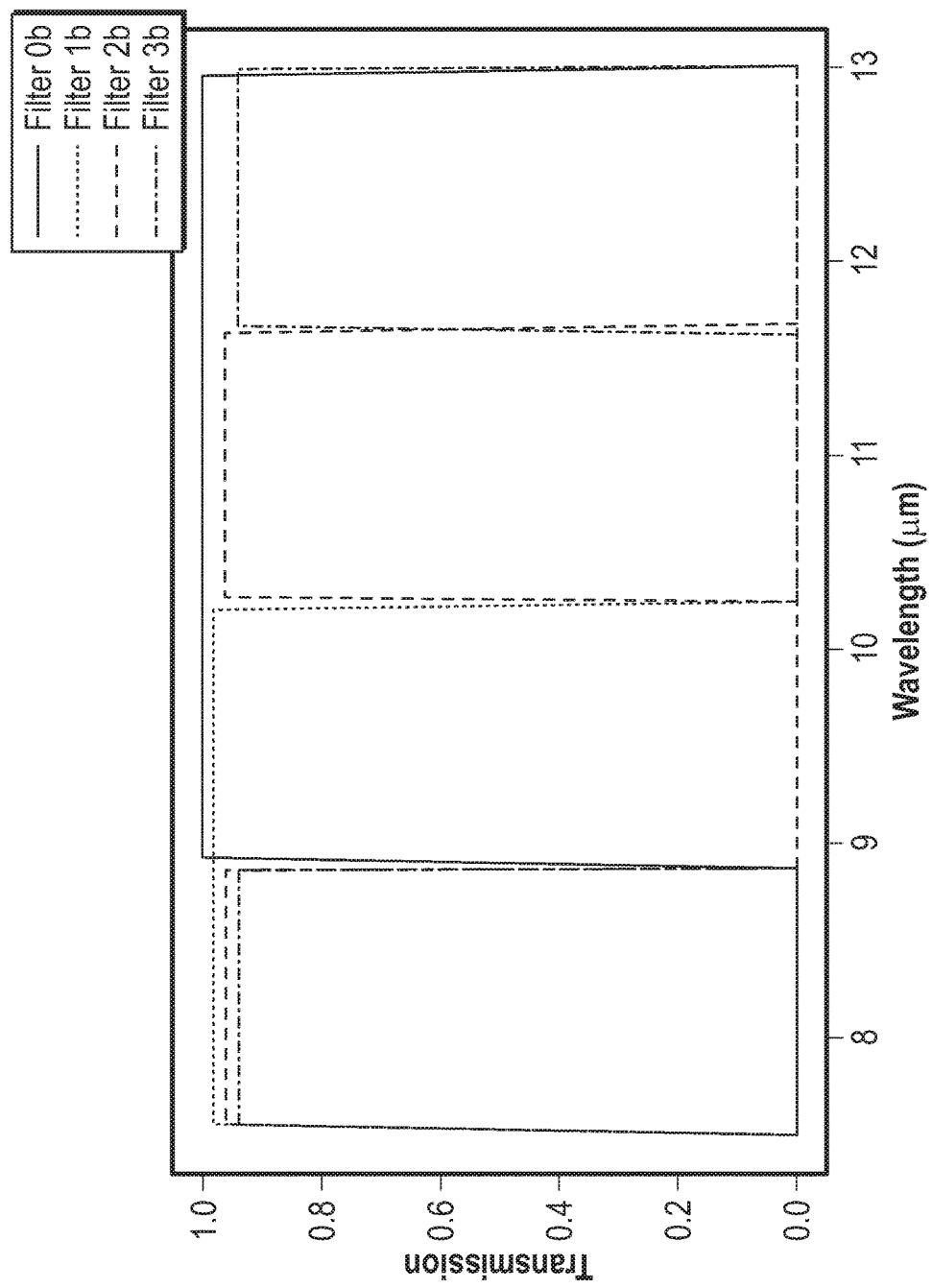
FIG. 6B depicts theoretical plots of transmission characteristics of spectrally multiplexed notch-pass filter combination used in an embodiment of the invention.

The optical filtering configuration of one present embodiment advantageously differs from a common approach used to measure spectra with an array of FPAs, where a bandpass filter defining a specified spectral band (such as, for example, any of the filters 0a through 4a the transmission curves of which are shown in FIG. 6A) is placed in front of the optical FPA (generally, between the optical FPA and the object). In particular, and in further reference to FIGS. 1, 2 3, and 4 when optical detector(s) 136, 236, 336, 456 of an embodiment include(s) microbolometers, the predominant contribution to noise associated with image acquisition is due detector noise. To compensate and/or reduce the noise, an embodiment of the invention utilizes spectrally-multiplexed filters. An example of spectral transmission characteristics of spectrally-multiplexed filters $0b$ through $4b$ for use with an embodiment of the invention is depicted in FIG. 6B. (Filters of FIG. 6B are so-called long-wavelength pass, LP filters. An LP filter generally attenuates shorter wavelengths and transmits (passes) longer wavelengths over the active range of the target IR portion of the spectrum. It is appreciated that, in a related embodiment, short-wavelength-pass filters, SP, may also be used. An SP filter generally attenuates longer wavelengths and transmits (passes) shorter wavelengths over the active range of the target IR portion of the spectrum.)

The related art appears to be silent with respect to an IR imaging system, adapted for detection of spectral signatures of chemical species that combines the use of the spectrally-multiplexed filters with a snap-shot image acquisition. The lack of such teaching can probably be explained by the fact that related imaging systems require the use of highly sensitive and, for that reason, expensive cooled FPAs with reduced noise characteristics. Accordingly, the systems of the related art are commonly employing bandpass filters instead, to take full advantage of spectral sensitivity of the used FPAs. Simply put, the use of spectrally multiplexed filters such as notched, LP, and SP filters would be counterproductive in a system of the related art, and would at least reduce an otherwise achievable SNR thereby degrading the performance of the related art system for the intended purpose. In contradistinction with the systems of the related art, however, and at least in part due to the snap-shot/non-scanning mode of operation, an embodiment of the imaging system of the invention is enabled to use less sensitive microbolometers without compromising the SNR. The use of microbolometers, as detector-noise-limited devices, in turn not only benefits from the use of spectrally multiplexed filters, but also does not require cooling of the imaging system during normal operation.

Referring again to FIGS. 6A, 6B, each of the filters ($0b$ ... $4b$) transmits light in a substantially wider region of spectrum as compared to those of the filters ($0a$ ... $4a$). Accordingly, when the spectrally-multiplexed set of filters ($0b$ ... $0d$) is used with an embodiment of the invention, the overall amount of light received by the FPAs (for example, 236, 336) is larger than would be received when using the bandpass filters ($0a$ ... $4a$). This "added" transmission of light defined by the use of the spectrally-multiplexed LP (or SP) filters facilitates increase of the signal on the FPAs above the level of the detector noise. Additionally, by using, in an embodiment of the invention, filters the spectra of which are wider than those of conventionally used band-pass filters, the uncooled FPAs of the embodiment experience less heating due radiation incident thereon from the imaged scene and from radiation emanation form the FPA in question itself, due to a reduction in the back-reflected thermal emission(s) coming from the FPA and reflecting off of the filter from the non band-pass regions. As the transmission region of the multiplexed LP (or SP) filters is wider, such parasitic effects are reduced thereby improving the overall performance of the FPA unit.

In one implementation, the LP and SP filters can be combined, in a spectrally-multiplexed fashion as described, in order to maximize the spectral extent of the transmission region of the filter system of the embodiment.

The advantage of using spectrally multiplexed filters is appreciated based on the following derivation, in which a system of M filters is examined (although it is understood that in practice an embodiment of the invention can employ any number of filters). For illustration, the case of M=7 is considered. Analysis presented below relates to one spatial location in each of sub-images formed by differing imaging channels defined by the system. As similar analysis can be performed for each point at a sub-image, the analysis can be appropriately extended as required.

The unknown amount of light within each of the M spectral channels (corresponding to these M filters) is denoted with $f_1, f_2, f_3, \ldots, f_M$, and readings from corresponding detector elements receiving light transmitted by each filter is denoted as $g_1, g_2, g_3 \ldots g_M$, while measurement errors are represented by $n_1, n_2, n_3, \ldots n_M$. Then, the readings at the seven FPA pixels each of which is optically filtered by a corresponding bandpass filter of FIG. 6A can be represented by:

$g_1 = f_1 + n_1$, $g_2 = f_2 + n_2$, $g_3 = f_3 + n_3$, $g_4 = f_4 + n_4$, $g_5 = f_5 + n_5$, $g_6 = f_6 + n_6$, $g_7 = f_7 + n_7$,

These readings (pixel measurements) $g_i$ are estimates of the spectral intensities $f_i$. The estimates $g_i$ are not equal to the corresponding $f_i$ values because of the measurement errors $n_i$. However, if the measurement noise distribution has zero mean, then the ensemble mean of each individual measurement can be considered to be equal to the true value, i.e. $\langle g_i \rangle = f_i$. Here, the angle brackets indicate the operation of calculating the ensemble mean of a stochastic variable. The variance of the measurement can, therefore, be represented as:

$\langle (g_i - f_i)^2 \rangle = \langle n_i^2 \rangle = \sigma^2$

In an alternative design utilizing spectrally-multiplexed filters and in comparison with the design utilizing bandpass filters, the amount of radiant energy transmitted by each of the spectrally-multiplexed LP or SP filters towards a given detector element can exceed that transmitted through a spectral band of a bandpass filter. IN this case, the intensities of light corresponding to the independent spectral bands can be reconstructed by computational means. (Such design is referred to as a "multiplex design").

One matrix of such "multiplexed filter" measurements includes a Hadamard matrix (requiring "negative" filters that may not be necessarily appropriate for the optical embodiments disclosed herein) An S-matrix approach (which is restricted to having a number of filters equal to an integer that is multiple of four minus one) or a row-doubled Hadamard matrix (requiring a number of filters to be equal to an integer multiple of eight) present alternative methodologies. Here, possible numbers of filters using an S-matrix setup are 3, 7, 11, etc and, if a row-doubled Hadamard matrix setup is used, then 8, 16, 24, etc. For example, the goal of the measurement may be to measure seven spectral band f intensities using seven measurements', as follows:

$g_1 = f_1 + 0 + f_3 + 0 + f_5 + 0 + f_7 + n_1$, $g_2 = 0 | f_2 | f_3 | 0 | 0 | f_6 | f_7 | n_2$ $g_3 = f_2 + f_2 + 0 + 0 + f_5 + 0 + f_7 + n_3$ $g_4 = 0 + 0 + 0 + f_4 + f_5 + f_7 + f_8 + n_4$ $g_5 = f_1 + 0 + f_3 + f_4 + 0 + f_6 + 0 + n_5$ $g_6 = 0 + f_2 + f_3 + f_4 + f_5 + 0 + 0 + n_6$ $g_7 = f_1 + f_2 + 0 + f_4 + 0 + 0 + f_7 + n_7$

Optical transmission characteristics of the filters described above are depicted in FIG. 6B. Here, we no longer have a direct estimate of the $f_i$ through a relationship similar to $(g_i) - f_i$. Instead, if a "hat" notation is used to denote an estimate of a given value, then a linear combination of the measurements can be used such as, for example, $$\hat{f}_1 = \frac{1}{4}(+g_1 - g_2 + g_3 - g_4 + g_5 - g_6 + g_7),$$

$$\hat{f}_2 = \frac{1}{4}(-g_1 + g_2 + g_3 - g_4 - g_5 + g_6 + g_7),$$

$$\hat{f}_3 = \frac{1}{4}(+g_1 + g_2 - g_3 - g_4 + g_5 + g_6 - g_7),$$

$$\hat{f}_4 = \frac{1}{4}(-g_1 - g_2 - g_3 + g_4 + g_5 + g_6 + g_7),$$

$$\hat{f}_5 = \frac{1}{4}(+g_1 - g_2 + g_3 + g_4 - g_5 + g_6 - g_7),$$

$$\hat{f}_6 = \frac{1}{4}(-g_1 + g_2 + g_3 + g_4 + g_5 - g_6 - g_7),$$

$$\hat{f}_7 = \frac{1}{4}(+g_1 + g_2 - g_3 + g_4 - g_5 - g_6 + g_7).$$

These $\hat{f}_i$ are unbiased estimates when the $n_i$ are zero mean stochastic variables, so that $\langle\hat{f}_i - f_i\rangle = 0$. The measurement variance corresponding to ith measurement is $$\langle(\hat{f}_i - f_i)^2\rangle = \frac{7}{16}\sigma^2$$

Therefore, by employing spectrally-multiplexed system the signal-to-noise ratio (SNR) of a measurement has been improved by a factor of $\sqrt{16/7} = 1.51$.

For N channels, the SNR improvement achieved with a spectrally-multiplexed system can be expressed as $(N+1)/(2\sqrt{N})$. For example, in an embodiment employing 12 spectral channels is characterized by SNR improvement, over a non-spectrally-multiplexed system, by a factor of up to 1.88.

Figure 6D:
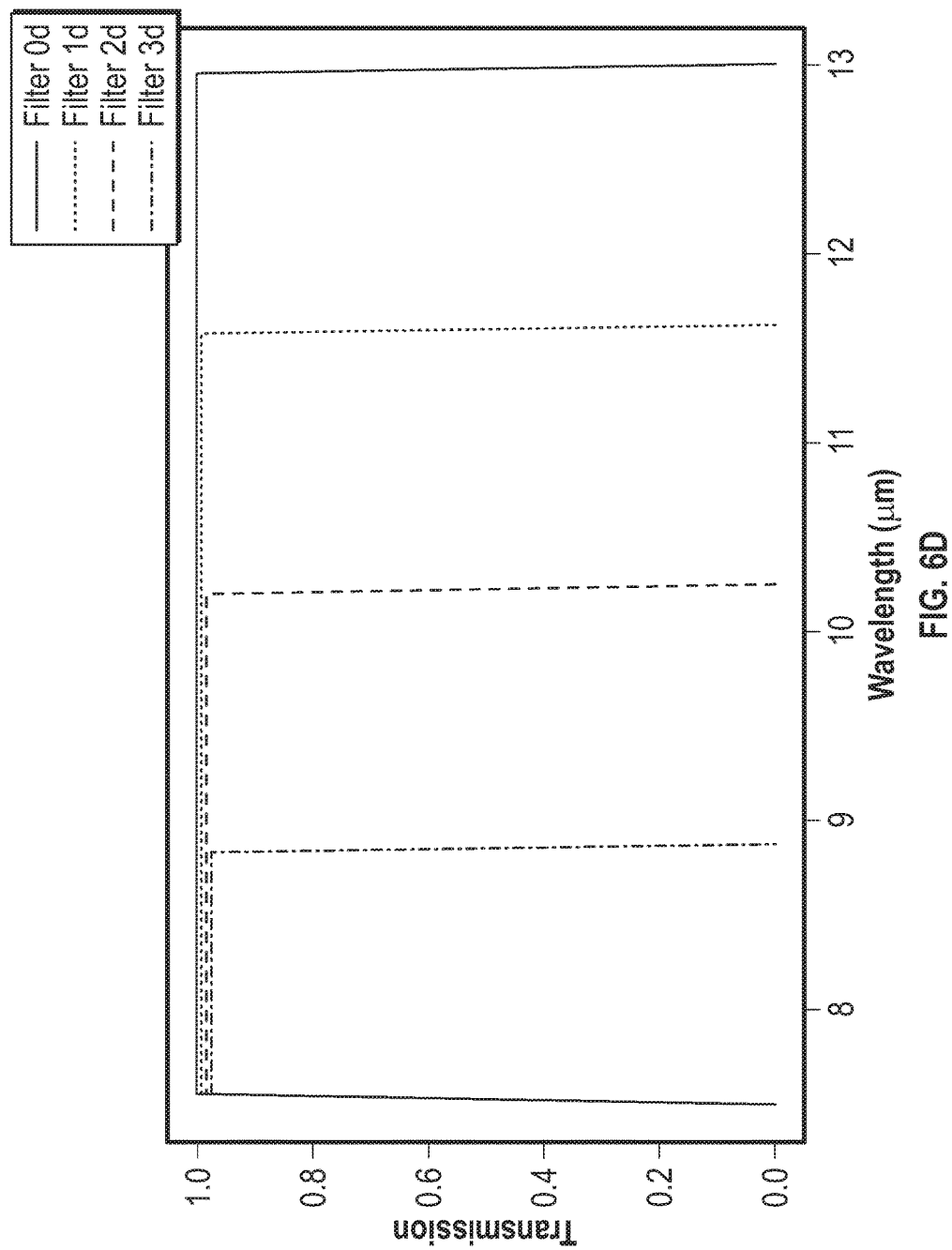
FIG. 6D shows theoretical plots of transmission characteristics of spectrally multiplexed short-pass filter combination used in an embodiment of the invention.

Two additional examples of related spectrally-multiplexed filter arrangements 0c through 4c, 0d through 4d from the use of which an embodiment of the invention can benefit when such embodiment includes an uncooled FPA (such as a microbolometer) are shown in FIGS. 6C and 6D. FIG. 6C illustrates a set of spectrally-multiplexed long-wavelength pass (LP) filters is used in the system. An LP filter generally attenuates shorter wavelengths and transmits (passes) longer wavelengths over the active range of the target IR portion of the spectrum. A single spectral channel having a transmission characteristic corresponding to the difference between the spectral transmission curved of at least two of these LP filters can be used to procure imaging data for the datacube with an embodiment of the invention.

As alluded to above, an embodiment may optionally, and in addition to temperature-controlled reference unit (for example temperature controlled shutters such as shutters 160; 160a, 160b), employ a field reference component (338 in FIG. 3A), or an array of field reference components (438 in FIG. 4), to enable dynamic calibration for spectral acquisition of every datacube, a spectrally-neutral camera-to-camera combination to enable dynamic compensation of parallax artifacts, and a visible and/or IR camera for compensation of motion artifacts. The use of the temperature-controlled reference unit (for example, temperature-controlled shutter system 160) and field-reference component(s) facilitates maintenance of proper calibration of each of the FPAs individually and the entire FPA unit as a whole.

In particular, and in further reference to FIGS. 1, 2, 3, and 4, the temperature-controlled unit generally employs a system having first and second temperature zones maintained at first and second different temperatures. For example, shutter system of each of the embodiments 100, 200, 300 and 400 can employ not one but at least two temperature-controlled shutters that are substantially parallel to one another and transverse to the general optical axis 226 of the embodiment(s) 100, 200, 300, 400. Referring, for example, to FIG. 4, in which such multi-shutter structure is already indicated, the use of multiple shutters enables the user to create a known reference temperature difference perceived, by the FPAs 456 through the IR radiation emitted by the shutter(s) 160a, 160b when these shutters are positioned to block the radiation from the object 110. As a result, not only the offset values corresponding to each of the individual FPAs pixels can be adjusted but also the gain values of these FPAs. In an alternative embodiment, the system having first and second temperature zones may include a single or multi-portion piece (such as a plate, for example) mechanically-movable across the optical axis with the use of appropriate guides and having a first portion at a first temperature and a second portion at a second temperature.

Indeed, the process of calibration of an embodiment of the invention starts with estimating gain and offset (that vary from detector pixel to detector pixel) by performing measurements of radiation emanating, independently, from at least two temperature-controlled shutters of known and different radiances. Specifically, first the response of the detector unit 456 to radiation emanating from one shutter (for example, shutter 160a that is blocking the FOV of the detectors 456 and the temperature $T_1$ of which is measured directly and independently with thermistors) is carried out. Following such initial measurement, the shutter 160a is removed from the optical path of light traversing the embodiment and another shutter (for example, 160b) is inserted in its place across the optical axis 226 to prevent the propagation of light through the system. The temperature of the second shutter 160b is $T_2 \neq T_1$ is also independently measured with thermistors placed in contact with this shutter, and the detector response to radiation emanating from the shutter 160b is also recorded. Denoting operational response of FPA pixels (expressed in digital numbers, or "counts") as g to a source of radiance $L_i$, the readings corresponding to the measurements of the two shutters can be expressed as:

$g_1 = \gamma L_1(T_1) + g_{offset}$ $g_2 \gamma L_2(T_2) + g_{offset}$

Here, $g_{offset}$ is the pixel offset value (in units of counts), and $\gamma$ is the pixel gain value (in units of counts per radiance unit). The solutions of these two equations with respect to the two unknowns $g_{offset}$ and $\gamma$ can be obtained if the values of $g_1$ and $g_2$ and the radiance values $L_1$ and $L_2$ are available (either measured by a reference instrument or calculated from the known temperatures $T_1$ and $T_2$ together with the known spectral response of the optical system and FPA). For any subsequent measurement, one can then invert the equation(s) above in order to estimate the radiance value of the object from the detector measurement, and this can be done for each pixel in each FPA array within the system.

As already discussed, and in reference to FIGS. 1 through 4 the field-reference apertures may be disposed in an object space or image space of the optical system, and dimensioned to block a particular portion of the IR radiation received from the object that, in absence of the field-reference aperture, would transmit through the optical system without traversing at least two spectrally-multiplexed optical filters. For example, the field-reference aperture the opening of which is substantially similar, in shape, to the boundary of the filter array (for example, and in reference to a filter array of FIGS. 3B, 5B—rectangular), can be placed in front of the objective lens (124, 224, 324, 424) at a distance that is at least several times (in one implementation—at least five times) larger than the focal length of the lens in order to minimize the image blur that would occur in absence of such field-reference. In the embodiment 400 of FIG. 4 the field-reference aperture can be placed within the depth of focus of an image conjugate plane formed by the front objective lens 424. The field reference, generally, effectuates and/or enables dynamic compensation in the system by providing a spectrally known and temporally-stable object within every scene to reference and stabilize the output from the different FPAs in the array.

Because each FPA's offset value is generally adjusted from each frame to the next frame by the hardware, comparing the outputs of one FPA with another can have an error that is not compensated for by the calibration parameters $g_{offset}$ and $\gamma$. In order to ensure that FPAs operate in radiometric agreement, it is necessary for a portion of each detector array to view a reference source (such as the field reference 338 in FIG. 3A, for example). Since the reference source spectrum is known a priori (such as a blackbody source at a known temperature), one can measure the response of each FPA to the reference source in order to estimate changes to the pixel offset value. An example calculation of the dynamic offset proceeds as follows.

Among the FPA elements in an array of FPAs in a given embodiment of the invention, we select one FPA to be the "reference FPA". We will attempt to make all of the FPAs agree with this one about the field reference temperature. The image measured in each FPA contains a set of pixels obscured by the field reference 338. Using the previously obtained calibration parameters $g_{offset}$ and $\gamma$ (the pixel offset and gain), we estimate the effective blackbody temperature T of the field reference as measured by each FPA i. That is, $$T_i = \text{mean}\{(g+\Delta g_i + g_{offset})/\gamma\} = \text{mean}\{(g-g_{offset})/\gamma\} \pm \Delta T_i$$

Here, the mean value is procured over all pixels that are obscured by the field reference, and $\Delta g_i$ is the difference in offset value of the current frame from $\Delta g_{offset}$ obtained during the calibration step. For the reference FPA, $\Delta g_i$ is simply set to zero. Then, using the temperature differences measured by each FPA, one obtains $$T_i - T_{ref} = \text{mean}\{(g+\Delta g_i + g_{offset})/\gamma\} + \Delta T_i - \text{mean}\{(g-g_{offset})/\gamma\} = \Delta T_i$$

Once $\Delta t_i$ for each FPA is measured, its value can be subtracted from each image in order to force operational agreement between such FPA and the reference FPA. While the calibration procedure has been discussed above in reference to calibration of temperature, a procedurally similar methodology of calibration with respect to radiance value can be implemented.

Examples of Methodology of Measurements

Prior to optical data acquisition with an embodiment of the IR imaging system of the invention, it is preferred to calibrate all the FPAs of the system (such as FPAs 336 each of which forms an image of the object in light delivered in a corresponding optical channel defined by the combination of the corresponding front objective and re-imaging lenses 324, 128a, in reference to FIG. 3). The calibration is necessitated by a need to form individual images in equivalent units (so that, for example, the reading from each of the FPA pixels can be re-calculated in units of temperature or radiance units). Moreover, while it is often neglected in practice, each of the FPAs should be spatially co-registered with one another so that a given pixel of a particular FPA can be confidently optically re-mapped through the optical system of the embodiment to the same location at the object as the corresponding pixel at another FPA.

To achieve at least some of these goals, a so-called spectral differencing method may be employed, which employs forming a difference image from various combinations of the images registered by two or more different FPAs. If the optical filter 130 corresponding to a particular FPA 336 transmits light from the object including a cloud of gas, for example, with a certain spectrum that contains the gas absorption peak or a gas emission peak while another filter 130 corresponding to another FPA 336 does not transmit such spectrum, then the difference between the images formed by the two FPAs at issue will highlight the presence of gas in the difference image.

A shortcoming of the spectral differencing method is that contributions of some auxiliary features associated with imaging (not just the target species such as gas itself) can also be highlighted in and contribute to the difference image. The so contributing effects include, to name just a few, parallax-induced imaging of edges of the object, influence of magnification differences between the two or more optical channels, and differences in rotational positioning and orientation between the FPAs. While magnification-related errors and FPA-rotation-caused errors can be compensated for by increasing the accuracy of the instrument construction as well as by post-processing of the acquired imaging, parallax is scene-induced and is not so easily correctable. In addition, while it is not widely recognized, the spectral differencing method is vulnerable to radiance calibration errors. Specifically, if one FPA registers radiance of light from a given feature of the object as that having a temperature of 40° C., for example, while the data from another FPA represents the temperature of the same object feature as being 39° C., then such feature of the object will be enhanced or highlighted in the difference image (formed at least in part based on the images provided by these two FPAs) due to such radiance-calibration error.

One solution to some of the problems introduced by the spectral differencing is to normalize the resulting image data by the data corresponding to a temporal reference image. This is referred to, for the purposes of this disclosure, as a temporal differencing algorithm or method. A temporal reference image may be formed, for example, by creating a difference image from the two or more images registered by the two or more FPAs at a single instance in time. It does not matter whether corollary of the use of the algorithm of the invention is that a prior knowledge of whether the object or scene contains a target species (such as gas of interest) does not affect the results because the algorithm highlights changes in the scene characteristics. Then, a spectral difference image can be calculated as discussed above based on a snap-shot image acquisition at any later time and subtracted from the temporal reference image to form a normalized difference image. The difference between the two highlights the target species (gas) within the normalized difference image, since this species was not present in the temporal reference frame. If necessary, more than two FPAs can be used both for registering the temporal reference image and a later-acquired difference image to obtain a better SNR figure of merit.

While the temporal differencing method can be used to reduce or eliminate some of the shortcomings of the spectral differencing, it can introduce unwanted problems of its own. For example, temporal differencing of imaging data is less sensitive to calibration and parallax induced errors than the spectral differencing of imaging data. However, any change in the imaged scene which is not related to the target species of interest (such as particular gas, for example) is highlighted in a temporally-differenced image, and thus may be erroneously perceived as a location of the target species triggering, therefore, an error in detection of target species. For example, if the temperature of the scenic background against which the gas is being detected changes (due to natural cooling down as the day progresses, or increases due to a person or animal or another object passing through the FOV of the IR imaging system), then such temperature change produces a signal difference as compared to the measurement taken earlier in time. Accordingly, the cause of the scenic temperature change (the cooling object, the person walking, etc.) may appear as the detected target species (such as gas). It follows, therefore, that an attempt to compensate for operational differences among the individual FPAs of a multi-FPA IR imaging system with the use of methods that turn on spectral or temporal differencing cause additional problems leading to false detection of target species. Among these problems are scene-motion-induced detection errors and parallax-caused errors that are not readily correctable and/or compensatable as of to-date. Accordingly, there is an unfulfilled need to compensate for image data acquisition and processing errors caused by motion of elements within the scene being imaged. Embodiments of data processing algorithms of the present invention address and fulfill the need to compensate for the motion-induced and parallax-induced image detection errors.

In particular, to minimize parallax-induced differences between the images produced with two or more predetermined FPAs, another difference image is used that is formed from the images of at least two different FPAs to estimate parallax effects. For example, the spectral differencing of the image data is being performed with the use of the difference between the images collected by the outermost two cameras in the array (such as, for example, the FPAs corresponding to filters 2 and 3 of the array of filters of FIG. 5A), forming a difference image referred to as a "difference image 2-3". In this case, the alternative "difference image 1-4" is additionally formed from the image data acquired by, for example, the alternative FPAs corresponding to filters 1 and 4 of FIG. 5A. Assuming or ensuring that both of these two alternative FPAs have approximately the same spectral sensitivity to the target species, the alternative "difference image 1-4" will highlight pixels corresponding to parallax-induced features in the image. Accordingly, based on positive determination that the same pixels are highlighted in the spectral "difference image 2-3" used for target species detection, the conclusion is made that the image features corresponding to these pixels are likely to be induced by parallax and not the presence of target species in the imaged scene. It should be noted that compensation of parallax can also be performed using images created by individual re-imaging lenses, 128a, when using a single FPA or multiple FPA's as discussed above.

Another capability of the embodiment of the invention is the ability to perform the volumetric estimation of a gas cloud volumetric estimation. This can be accomplished by using (instead of compensating or negating) the parallax-induced effects described above. In this case, the measured parallax between two or more similar spectral response images can be used to estimate a distance between the imaging system and the gas cloud or between the imaging system and an object in the field of view of the system. The parallax-induced transverse image shift d between two images is related to the distance z between the cloud or object and the imaging system according to $z=-sz'/d$, where s is the separation between two similar spectral response images, and z' is the distance to the image plane from the back lens (z' is typically approximately equal to the focal length f of the lens of the imaging system). Once the distance z between the cloud and the imaging system is calculated, the size of the gas cloud can be determined based on the magnification equation, $m=f/z$, where each image pixel on the gas cloud, $\Delta x'$, corresponds to a physical size in object space $\Delta x=\Delta x'/m$. To estimate the volume of the gas cloud, a particular symmetry in the thickness of the cloud based on the physical size of the cloud can be assumed. For example, the cloud image can be rotated about a central axis running through the cloud image to create a three dimensional volume estimate of the gas cloud size. It is worth noting that only a single imaging system of the invention is required for such volume estimation, in contradistinction with carrying out such estimate with a spectral imaging system of related art (in which case at least two imaging systems would be necessary). Indeed, due to the fact that the information about the angle at which the gas cloud is seen by the system is decoded in the parallax-effect, the image data includes the information about the imaged scene viewed by the system in association with at least two angles.

When the temporal differencing algorithm is used for processing the acquired imaging data, a change in the scene that is caused not by the target species is highlighted in the resulting image. According to an embodiment of the invention, compensation of this error makes use of the temporal differencing between two FPAs that are substantially equally spectrally sensitive to the target species. In this case, the temporal difference image will highlight those pixels the spectra of which have changed in time. Subtracting the data corresponding to these pixels at both FPAs to form the resulting image, therefore, excludes the contribution of the target species to the resulting image. The differentiation between (i) changes in the scene due to the presence of target species and (ii) changes in the scene caused by changes in the background not associated with the target species is, therefore, enabled. It should be noted that, quite unexpectedly, the data acquired with the visible-light FPA (when present as part of the otherwise IR imaging system) can also be used to facilitate such differentiation and compensation of the motion-caused imaging errors. Visible cameras generally have much lower noise figure than IR cameras (at least during daytime). Consequently, the temporal difference image obtained with the use of image data from the visible-light FPA can be quite accurate. The visible FPA can be used to compensate for motion in the system as well as many potential false-alarms in the scene due to motion caused by people, vehicles, birds, and steam, for example, as long as the moving object can be observed in the visible region of the spectra. This has the added benefit of providing an additional level of false alarm suppression without reducing the sensitivity of the system since many targets such as gas clouds cannot be observed in the visible spectral region.

Another method for detection of the gases is to use a spectral unmixing approach. A spectral unmixing; approach assumes that the spectrum measured at a detector pixel is composed of a sum of component spectra, and attempts to estimate the relative weights of these components needed to derive the measurement spectrum. The component spectra are generally taken from a predetermined spectral library (for example, from data collection that has been empirically assembled), though sometimes one can use the scene to estimate these as well (often called "endmember determination"). For the gas cloud detection, the component spectra include the absorption spectra of various gases of interest, while the "measurement spectrum" is not the raw measurement of spectral intensity values but rather an "absorption spectrum", which includes the spectrum of background light absorbed on transmission through a cloud The spectral unmixing methodology can also benefit from temporal, parallax, and motion compensation techniques.

Examples of Practical Embodiments and Operation

The embodiment 300 of FIG. 3 was configured to employ 12 optical channels and 12 corresponding microbolometer FPAs as 336 and used to capture a video sequence (representing images of a standard laboratory scene) substantially immediately after performing calibration measurements with the use of a reference source including two shutters, as discussed above (one at room temperature and one 5° C. above room temperature). The use of 12 FPAs offers a good chance of simultaneous detection and estimation of the concentrations of about 8 or 9 gases present at the scene, but the number of FPAs 336 can vary, depending on the balance between the operational requirements and consideration of cost.

Due to the specifics of operation in the IR range of the spectrum, the use of the so-called noise-equivalent temperature difference (or NETD) is preferred and is analogous to the SNR commonly used in visible spectrum instruments. The array of microbolometer FPAs 336 is characterized to perform at NETD≤72 mK at an f-number of 1.2. Each measurement was carried out by summing four consecutive frames, and the reduction in the NETD value expected due to such summation would be described by corresponding factor of $\sqrt{4}=2$. Under ideal measurement conditions, therefore, the FPA NETD should be about 36 mK.

The commercially off-the-shelf LP, SP, and/or BP filters were used as the filters 130. Using the image data acquired at each FPA pixel, the processor of the system was used to calculate the mean value and the standard deviation of the image data across the video sequence, to form a data output representing a "mean image" and a "standard deviation image" of the scene.

Table 1 summarizes the "mean NETD" values obtained by averaging of the NETD values over all pixels of the standard deviation image", as well as the median NETD values obtained in a similar fashion, in degrees Celsius. The top section of Table 1 shows the results for the bandpass filters, the middle section of Table 1 shows the results for the LP and SP filters, and the bottom section of Table 1 presents data for differences between NETD values of two specified LP filters. (Note that no filter is treated as equivalent to a longpass filter here.)

The results of Table 1 indicate that the difference between the NETD values of the two chosen LP filters is substantially smaller than the NETD value corresponding to a single BP filter, thereby providing an experimental proof that the use of an embodiment of the invention as discussed above provides an unexpected increase in a SNR-type figure of merit of the IR spectral imaging in comparison with a system of related art. In other words, the use of two (or more) LP or SP filters to extract the imaging data results in a spectrally-narrowed imaging channel having a higher operational performance as compared with the use of a bandpass filter centered on the chose wavelength in the same spectral channel.

It is worth noting that the use of optically-filtered FPAs rather than a more conventional Fourier Transform spectrometer (FTS) in an embodiment of the invention is partly explained by a larger number of total pixels available with a single large format microbolometer FPA array. More importantly, however, the use of the FTS is well recognized to require tight mechanical tolerances, leading to sufficiently more complex assembly of the imaging system employing the FTS as compared to the assembly of the embodiment of the invention. Additionally, the FTS does not offer a high enough optical throughput for a substantially low number of optical channels (for example, between 4 and 50 optical channels) (in part because many of the sampled wavenumber values in the reconstructed spectrum do not correspond to regions of the spectrum that the FTS instrument is sensitive to, and so such sampled data is eventually discarded and not used for image formation and detection of target species). The FTS is better suited to higher resolution spectroscopy. The problem with working with highly-resolved spectra, however, is that by sampling the same amount of incident light with smaller spectral bins means that image data corresponding each bin is actually noisier. Therefore, while improved spectral resolution accorded by the FTS can allow the user to pick locations in the spectrum that are highly specific to the absorption/emission signature of the target species, it also makes such signature weaker relative to the detection noise.

A major advantage of the embodiments of the present system over instruments of the related art that are configured for target species detection (for example, gas cloud detection) is that, according to the present invention, the entire spectrum is resolved in a snapshot mode (for example, during one image frame acquisition by the FPA array). This enables the system of the invention to take advantage of the compensation algorithms such as the parallax and motion compensation algorithms mentioned above. Indeed, as the imaging data required to implement these algorithms are collected simultaneously with the target-species related data, the compensation algorithms are carried out with respect to target-species related data and not with respect to data acquired at another time interval, thereby ensuring accuracy of the data compensation process. In addition, the frame rate of data acquisition is much higher (the present system operates at up to video rates; from about 5 Hz and higher, for example), so that the user is enabled to recognize in the images the wisps and swirls typical of gas mixing without blurring out of these dynamic image features and other artifacts caused by the change of scene (whether spatial or spectral) during the lengthy measurements. In contradistinction with the imaging systems of the related art that require image data acquisition over a period of time exceeding a single-snap-shot time and, therefore, blur the target gas features in the image and inevitably reduce the otherwise achievable sensitivity of the detection, embodiments of the present invention make detecting the localized concentrations of gas without it being smeared out and/or averaged with the areas of thinner gas concentrations. In addition, the higher frame rate also enables a much faster response rate to a leak of gas (when detecting such leak is the goal): an alarm can trigger within fractions of a second rather than several seconds.

TABLE 1

| filter | NETD (deg C.) | |
| --- | --- | --- |
| | mean | median |
| BP-8224 | 0.691 | 0.675 |
| BP-9000 | 0.938 | 0.923 |
| BP-9480 | 0.318 | 0.315 |
| BP-9740 | 0.372 | 0.369 |
| BP-10240 | 0.275 | 0.286 |
| BP-10700 | 0.409 | 0.405 |
| BP-10962 | 0.44 | 0.437 |
| BP-11660 | 0.548 | 0.542 |
| BP-12227 | 0.48 | 0.475 |
| BP-13289 | 1.309 | 1.26 |
| [none] | 0.038 | 0.037 |
| LP-8110 | 0.063 | 0.063 |
| LP-8500 | 0.076 | 0.075 |
| LP-8110 | 0.068 | 0.067 |
| LP-8305 | 0.068 | 0.067 |
| LP-8500 | 0.08 | 0.08 |
| LP-9000 | 0.073 | 0.073 |
| LP-9650 | 0.099 | 0.098 |
| LP-9800 | 0.109 | 0.108 |
| LP-11000 | 0.156 | 0.156 |
| LP-11450 | 0.207 | 0.206 |
| SP-10500 | 0.07 | 0.07 |
| [none]-[LP-8110] | 0.07 | (i.e. methane) |
| [LP-9650]-[LP-11450] | 0.208 | (i.e. propylene) |
| [LP-9800]-[LP-11000] | 0.227 | (i.e. butane) |

Figure 7:
FIG. 7 is a set of video-frames illustrating operability of an embodiment of the invention used for gas detection.

To demonstrate the operation and gas detection capability of an embodiment of the invention, a prototype was constructed in accordance with the embodiment 300 of FIG. 3A and used to detect a hydrocarbon gas cloud of propylene at a distance of approximately 10 feet. FIG. 7 illustrates video frames 1 through 12 representing gas-cloud-detection output 710 (seen as a streak of light) in a sequence from t=1 to t=12. The images 1 through 12 are selected frames taken from a video-data sequence captured at a video-rate of 15 frames/sec. The detected propylene gas is shown as a streak of light 710 (highlighted in red) near the center of each image. The first image is taken just prior to the gas emerging from the nozzle of a gas-contained, while the last image represents the system output shortly after the nozzle has been turned off.

Figure 8A:
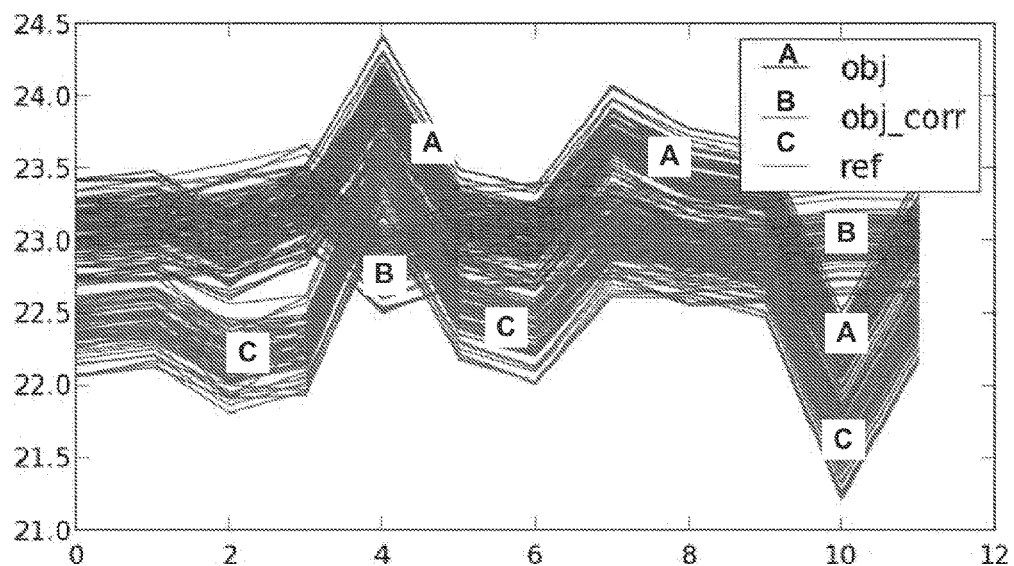
FIGS. 8A, 8B are plots illustrating results of dynamic calibration of an embodiment of the invention.
Figure 8B:
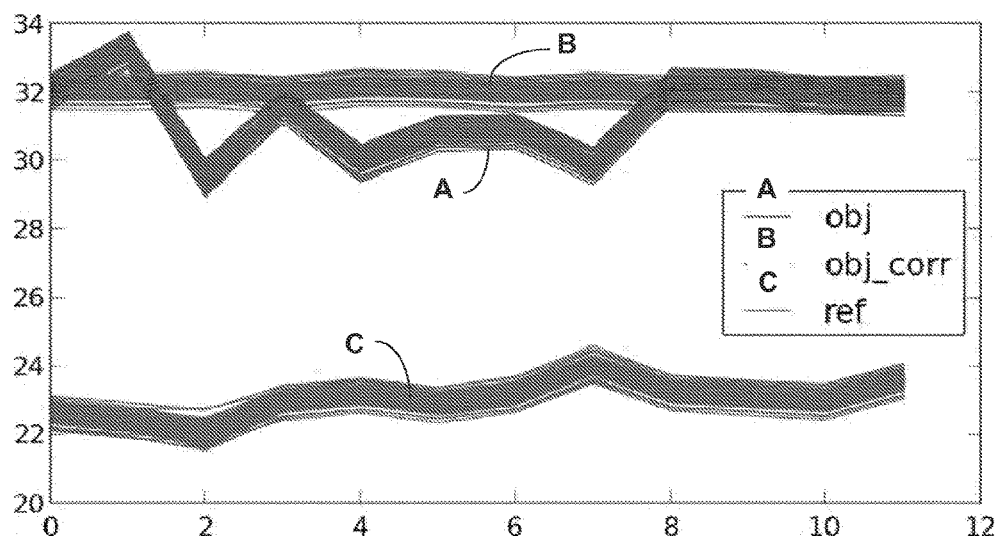

Using the same prototype of the system, the demonstration of the dynamic calibration improvement described above by imaging the scene surrounding the system (the laboratory) with known temperature differences. The result of implementing the dynamic correction procedure is shown in FIGS. 8A, 8B, where the curves labeled "obj" (or "A") represent temperature estimates of an identified region in the scene. The abscissa in each of the plots of FIGS. 8A, 8B indicates the number of a detector element, while the ordinate corresponds to temperature (in degrees C.). Accordingly, it is expected that when all detector elements receive radiant data that, when interpreted as the object's temperature, indicates that the object's temperature perceived by all detector elements is the same, any given curve would be a substantially flat line. Data corresponding to each of the multiple "obj" curves are taken from a stream of video frames separated from one another by about 0.5 seconds (for a total of 50 frames). The recorded "obj" curves shown in FIG. 8A indicate that the detector elements disagree about the object's temperature, and that difference in object's temperature perceived by different detector elements is as high as about 2.5° C. In addition, all of the temperature estimates are steadily drifting in time, from frame to frame. The curves labelled "ref" (or "C") correspond to the detectors' estimates of the temperature of the aperture 338 of the embodiment 300 of FIG. 3A. The results of detection of radiation carried out after each detector pixel has been subjected to the dynamic calibration procedure described above are expressed with the curved labeled "obj corr" (or "B"). Now, the difference in estimated temperature of the object among the detector elements is reduced to about 0.5° C. (thereby improving the original reading at least by a factor of 5).

FIG. 8B represents the results of similar measurements corresponding to a different location in the scene (a location which is at a temperature about 9° C. above the estimated temperature of the aperture 338 of FIG. 3A). As shown, the correction algorithm discussed above is operable and effective and applicable to objects kept at different temperature. Accordingly, the algorithm is substantially temperature independent.

At least some elements of a device of the invention can be controlled—and at least some steps of a method of the invention can be effectuated, in operation—with a programmable processor governed by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific integrated Circuits (ASICs), Field-Programmable Gate Arrays (FPGAs) or other hardware or some combination of hardware, software and/or firmware components.

While examples of embodiments of the system and method of the invention have been discussed in reference to the gas-cloud detection, monitoring, and quantification (including but not limited to greenhouse gases such as Carbon Dioxide, Carbon Monoxide, Nitrogen Oxide as well as hydrocarbon gases such as Methane, Ethane, Propane, n-Butane, iso-Butane, n-Pentane, iso-Pentane, neo-Pentane, Hydrogen Sulfide, Sulfur Hexafluoride, Ammonia, Benzene, p- and m-Xylene, Vinyl chloride, Toluene, Propylene oxide, Propylene, Methanol, Hydrazine, Ethanol, 1,2-dichloroethane, 1,1-dichloroethane, Dichlorobenzene, Chlorobenzene, to name just a few), embodiments of the invention can be readily adapted for other chemical detection applications. For example, detection of liquid and solid chemical spills, biological weapons, tracking targets based on their chemical composition, identification of satellites and space debris, opthalmological imaging, microscopy and cellular imaging, endoscopy, mold detection, fire and flame detection, and pesticide detection are within the scope of the invention.

What is claimed is:

1. An infrared (IR) imaging system, the imaging system comprising:
    an optical system including an optical focal plane array (FPA) unit, the optical system including components associated with two optical channels, said two optical channels being spatially and spectrally different from one another, each of the two optical channels positioned to transfer IR radiation incident on the optical system towards the optical FPA unit, the optical FPA unit comprising two groups of detector pixels disposed at a distance from two corresponding focusing lenses;
    a thermal reference, wherein radiation emitted from the thermal reference directed towards the optical FPA unit is received by at least one of the two groups of detector pixels simultaneously with radiation emitted from a scene viewed by the imaging system; and
    a data-processing system, said data-processing system configured to:
        acquire a plurality of image frames with the two groups of detector pixels having regions in the plurality of image frames that correspond to radiation emitted from the thermal reference; and
        dynamically calibrate the two groups of detector pixels based on a measurements obtained by the two groups of detector pixels using the radiation received from the thermal reference.

2. The system of claim 1, wherein the optical FPA unit does not require a cooler to cool during normal operation.

3. The system of claim 1, wherein the IR radiation comprises wavelengths between about 1 micron and about 20 microns.

4. The system of claim 1, wherein the data-processing system is configured to map an overall image datacube representing a spatial distribution of concentrations c of a target species.

5. The system of claim 1, wherein the system is configured to identify target species in the scene.

6. The system of claim 1, further comprising two spectral filters, each filter positioned in a respective one of said two optical channels.

7. The system of claim 6, wherein at least one of the two spectral filters is a long pass (LP) filter.

8. The system of claim 6, wherein at least one of the two spectral filters is a short pass (SP) filter.

9. The system of claim 6, further comprising at least two reimaging lenses, each reimaging lens positioned to transmit a portion of the IR radiation transmitted through a respective one of said two spectral filters towards the optical FPA unit.

10. The system of claim 1, wherein the thermal reference is a field reference comprising an optical aperture that circumscribes said two optical channels.

11. The system of claim 1, wherein the thermal reference has a uniform temperature across its surface.

12. The system of claim 1, wherein the thermal reference is configured to obscure a peripheral portion of the incident IR radiation.

13. The system of claim 1, wherein a parameter of one of the two groups of detector pixels is adjusted based on the measurement obtained by the other of the two groups of detector pixels.

14. The system of claim 1, wherein the measurements obtained by the two groups of detector pixels using the radiation received from the thermal reference are temperature estimates of the thermal reference.

15. The system of claim 14, wherein a parameter of one of the two groups of detector pixels is adjusted based on the temperature estimate of the thermal reference obtained by the other of the two groups of detector pixels.

16. The system of claim 1, wherein one of the two groups of detector pixels comprises a first focal plane array and the other of the two groups of detector pixels comprises a second focal plane array.

* * * * *